US012718644B2

(12) United States Patent
Haraguchi et al.

(10) Patent No.: US 12,718,644 B2

(45) Date of Patent: Aug. 25, 2026

(54) FRAUD PREVENTION MECHANISM, PAPER SHEET TRANSPORT DEVICE, AND PAPER SHEET HANDLING DEVICE

(71) Applicant: JAPAN CASH MACHINE CO., LTD., Osaka (JP)

(72) Inventors: Kohei Haraguchi, Osaka (JP); Toru Seki, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 452 days.

(21) Appl. No.: 18/562,258

(22) PCT Filed: Mar. 24, 2022

(86) PCT No.: PCT/JP2022/013993

§ 371 (c)(1),
(2) Date: Nov. 17, 2023

(87) PCT Pub. No.: WO2022/249703

PCT Pub. Date: Dec. 1, 2022

(65) Prior Publication Data

US 2024/0378936 A1 Nov. 14, 2024

(30) Foreign Application Priority Data

May 27, 2021 (JP) ................................ 2021-089228

(51) Int. Cl.
*G07D 11/13* (2019.01)
*G07D 11/00* (2019.01)
(Continued)

(52) U.S. Cl.
CPC ......... *G07D 11/13* (2019.01); *G07D 11/0096* (2013.01); *G07D 11/16* (2019.01);
(Continued)

(58) Field of Classification Search
CPC .... G07D 11/13; G07D 11/0096; G07D 11/16; G07D 11/237; G07D 11/14;
(Continued)

(56) References Cited

U.S. PATENT DOCUMENTS

| | | | |
|---|---|---|---|
| 5,577,589 A | 11/1996 | Garcia Tinoco | |
| 11,922,752 B2 * | 3/2024 | Haraguchi .......... | G07D 11/225 |

(Continued)

FOREIGN PATENT DOCUMENTS

| | | |
|---|---|---|
| CN | 1472706 A | 2/2004 |
| EP | 0940781 A1 | 9/1999 |

(Continued)

OTHER PUBLICATIONS

English Translation of WO 2019/146168 A1. (Year: 2019).*

(Continued)

*Primary Examiner* — Jeffrey A Shapiro

(74) *Attorney, Agent, or Firm* — MASUVALLEY & PARTNERS; Peter Martinez

(57) ABSTRACT

The present invention includes an opening/closing member, a rotary member that rotates integrally with the opening/closing member, a driving member for opening/closing member driving, that is arranged to oppose the rotary member and that is axially supported to be capable of relatively rotating with respect to the rotary member, and a drive transmission mechanism that transmits a drive force from the driving member to the rotary member, in which the drive transmission mechanism includes a driven piece, and a driving piece that rotationally drives the rotary member by pressing the driven piece, and a value of a circumferential backlash (θ3) between the driven piece and the driving piece is set to a value that enables prevention of the opening/closing member from being rotated to transition to the initial rotational posture by an operation from outside while the opening/closing member is stopped in the non-initial rotational posture.

5 Claims, 12 Drawing Sheets

(51) Int. Cl.

| | |
|---|---|
| ***G07D 11/16*** | (2019.01) |
| ***G07D 11/237*** | (2019.01) |
| *G07D 11/14* | (2019.01) |

(52) U.S. Cl.
CPC ........... *G07D 11/237* (2019.01); *G07D 11/14* (2019.01); *G07D 2211/00* (2013.01)

(58) Field of Classification Search
CPC .... G07D 2211/00; G07D 11/225; G07F 7/04; G07F 1/04; G07F 1/041; G07F 19/20; G07F 19/209; B65H 2701/1912
USPC .......................................................... 194/203
See application file for complete search history.

(56) References Cited

U.S. PATENT DOCUMENTS

| | | | |
|---|---|---|---|
| 2004/0011619 | A1 | 1/2004 | Yoshioka et al. |
| 2004/0149537 | A1 | 8/2004 | Pai |
| 2013/0180821 | A1 | 7/2013 | Clauser et al. |
| 2021/0082224 | A1 | 3/2021 | Haraguchi |

FOREIGN PATENT DOCUMENTS

| | | | | | |
|---|---|---|---|---|---|
| EP | 3745364 | A1 | | 12/2020 | |
| JP | 2001-188934 | A | | 7/2001 | |
| JP | 3817342 | B2 | | 9/2006 | |
| KR | 200449406 | Y1 | | 7/2010 | |
| TW | 201933289 | A | | 8/2019 | |
| WO | WO 1994014141 | A1 | | 6/1994 | |
| WO | WO 2019/146168 | A1 | * | 8/2019 | ............. G07D 11/16 |

OTHER PUBLICATIONS

WIPO, JPO as International Search Authority, International Search Report (with English translation) and Written Opinion mailed May 10, 2022 in International Patent Application No. PCT/JP2022/013993, 9 pages.

European Patent Office, Extended European Search Report dated May 16, 2025 in European Patent Application No. 22810979.9, 14 pages.

* cited by examiner (a)

(b)

(c)

SECTIONAL VIEW ALONG A-A (d)

(a)

(b)

(a)

(b)

FRAUD PREVENTION MECHANISM, PAPER SHEET TRANSPORT DEVICE, AND PAPER SHEET HANDLING DEVICE

RELATED APPLICATIONS

This application is the U.S. National Phase of and claims priority to International Patent Application No. PCT/JP2022/013993, International Filing Date Mar. 24, 2022, entitled Fraud Prevention Mechanism, Sheet Transport Device, And Sheet Handling Device, which claims benefit of Japanese Application No. JP2021-089228 filed May 27, 2021, both of which are incorporated herein by reference in their entireties.

FIELD

The present invention relates to a fraud prevention mechanism, a paper sheet transport device, and a paper sheet handling device that prevent a fraudulent extraction act on a paper sheet such as a banknote.

BACKGROUND

In various types of banknote handling devices such as a banknote deposit machine, various vending machines, and a money changer, an act is performed where a banknote to which fraudulent means for extraction, for example, a wire such as a fishing line or a cord, or a tape that is hard to detect with a sensor is attached is inserted into a machine from an inlet, and the fraudulent means extending outside from the inlet is pulled back to retrieve the banknote from the inlet after recognition processing of the banknote ends and the banknote is transported to a banknote storage (a stacker device) and stored therein, so that goods or services are fraudulently received.

Patent Document 1 discloses a banknote authentication device in which a rotary body including a slit that opens a passage to allow a banknote to pass when in an initial rotational posture (a home position) and closes the passage to block pass of a banknote when in a non-initial rotational posture out of the initial rotational posture is arranged on a banknote transport route. According to this device, pass of a banknote to which fraudulent means such as a wire is attached through the slit can be reliably detected, and misalignment of a stop position of the rotary body due to overrun caused by an inertial force of a motor, or a damage of the rotary body or a rotational driving device for the rotary body when the rotary body is stopped in the initial rotational posture can be prevented. In this banknote authentication device, the rotary body is maintained in the non-initial rotational posture so as not to cause the slit to be communicated with the passage in a standby state in which insertion of a banknote from the inlet into the device is not detected. At a time when insertion of a banknote is detected, the rotary body is rotationally driven to be in the initial rotational posture. Control to rotate the rotary body a required number of times at an appropriate time after pass of a banknote inserted into the device through the slit is executed for each banknote, so that when a wire or the like is attached to the banknote, the wire or the like attached to the banknote is twined and caught by the rotary body. Accordingly, whether there is a fraudulent act can be detected on the basis of information such as a change in the rotation speed of the rotary body caused by winding of a wire or the like while the wire or the like is twined and caught by the rotary body to prevent retraction of the wire.

Furthermore, in Patent Document 1, a gear is assembled to be capable of coaxially and relatively rotating with respect to the rotary body including the slit and a projection-like connection provided on the rotary body is pressed by a projection provided on the gear to rotationally move the rotary body that has not been in the initial rotational posture toward the initial rotational posture. When the rotary body is stopped at a time when a sensor detects that the rotary body has reached the initial rotational posture, a gap as a deceleration section is formed between the connection of the rotary body and the projection of the gear. Therefore, the projection of the gear rotates while decelerating also after stop of the connection until the deceleration section is lost. Accordingly, an impact force at the time of contact with the connection is decreased, so that a damage on the rotary body or the rotational driving device of the rotary body can be prevented and the slit can be reliably positioned in the initial rotational posture (overrun can be prevented) at the time of stop of the rotary body.

In order to realize a quick and efficient banknote handling operation, it is more advantageous to provide no deceleration section or as small a deceleration section as possible. However, if as small a deceleration section as possible is formed and the deceleration sections for all devices are set to be same, it is difficult to execute control to stop the gear at accurate position and timing. It is more difficult to find an optimum value of the deceleration section for each device, and adjust and set the deceleration section to the value differing according to devices because the productivity is lowered. Since an actual device design has a great need to avoid the disadvantage described above in a case in which the deceleration section is too small, the value of the deceleration section, that is, a circumferential range (angle) is generally set in advance to a larger value in view of the variation described above. Practically, in an actual device of the device described in Patent Document 1, the deceleration section described above is set to be a large value of about 260 degrees.

However, if the backlash angle (the deceleration section) between the connection of the rotary body and the projection of the gear is set to be large, the rotary body can be freely rotated within the backlash angle with respect to the gear by some fraudulent operation from outside. That is, the rotary body that should keep the slit and the passage in a non-communicated state at a standby time when no banknote is inserted can be rotated by a required angle by a fraudulent operation from outside to enable the slit and the passage to be communicated with each other. In this case, a fraudulent access to the downstream side (for example, a banknote storage) of the rotary body from outside of the device is adversely allowed. As a result of a fraudulent access, a fraudulent act is performed, for example, in a vending machine, in which a banknote once having been input can be retrieved while a product is received.

That is, in the configuration described in Patent Document 1, the rotary body can be stopped at a position where the slit and the transport route are not aligned with each other at a standby time. However, there is a problem that the configuration cannot address other fraudulent acts performed in a state in which the rotary body is fraudulently moved to the initial rotational posture at the standby time.

CITATION LIST

Patent Literature

Patent Literature 1: Patent Publication No. 3817342

SUMMARY

Technical Problem

The present invention has been made in view of the above circumstances, and provides a fraud prevention mechanism, a paper sheet transport device, and a paper sheet handling device including an opening/closing member for fraud detection and fraud prevention, that is provided on a paper sheet transport route and that allows or blocks pass of a banknote by changing a rotational posture.

Solution to Problem

In order to achieve the above object, a fraud prevention mechanism according to the present invention is a fraud prevention mechanism that is installed on a paper sheet transport route to prevent a fraudulent act on a paper sheet, comprising: an opening/closing member that allows pass of the paper sheet when in an initial rotational posture, and that blocks pass of the paper sheet when in a non-initial rotational posture out of the initial rotational posture; a rotary member that rotates integrally with the opening/closing member; a driving member for opening/closing member driving, that is arranged to oppose the rotary member and that is axially supported to be capable of relatively rotating with respect to the rotary member; and a drive transmission mechanism that transmits a drive force from the driving member to the rotary member, wherein the drive transmission mechanism includes a driven piece provided on the rotary member, and a driving piece that is provided on the driving member and that rotationally drives the rotary member by pressing the driven piece in a course of relatively rotationally moving with respect to the driven piece, a circumferential backlash for allowing rotation of the driven piece with respect to the driving piece stopped rotating is provided between the driven piece and the driving piece, and an angle of the opening/closing member in the non-initial rotational position, and a value of the circumferential backlash are set to a value that enables prevention of the opening/closing member from being rotated to transition to the initial rotational posture by an operation from outside while the opening/closing member is stopped in the non-initial rotational posture.

Advantageous Effects of Invention

According to the present invention, fraudulent acts on a paper sheet can be prevented in a fraud prevention mechanism including an opening/closing member for fraud detection and extraction prevention.

DESCRIPTION OF EMBODIMENTS

Figure 1:
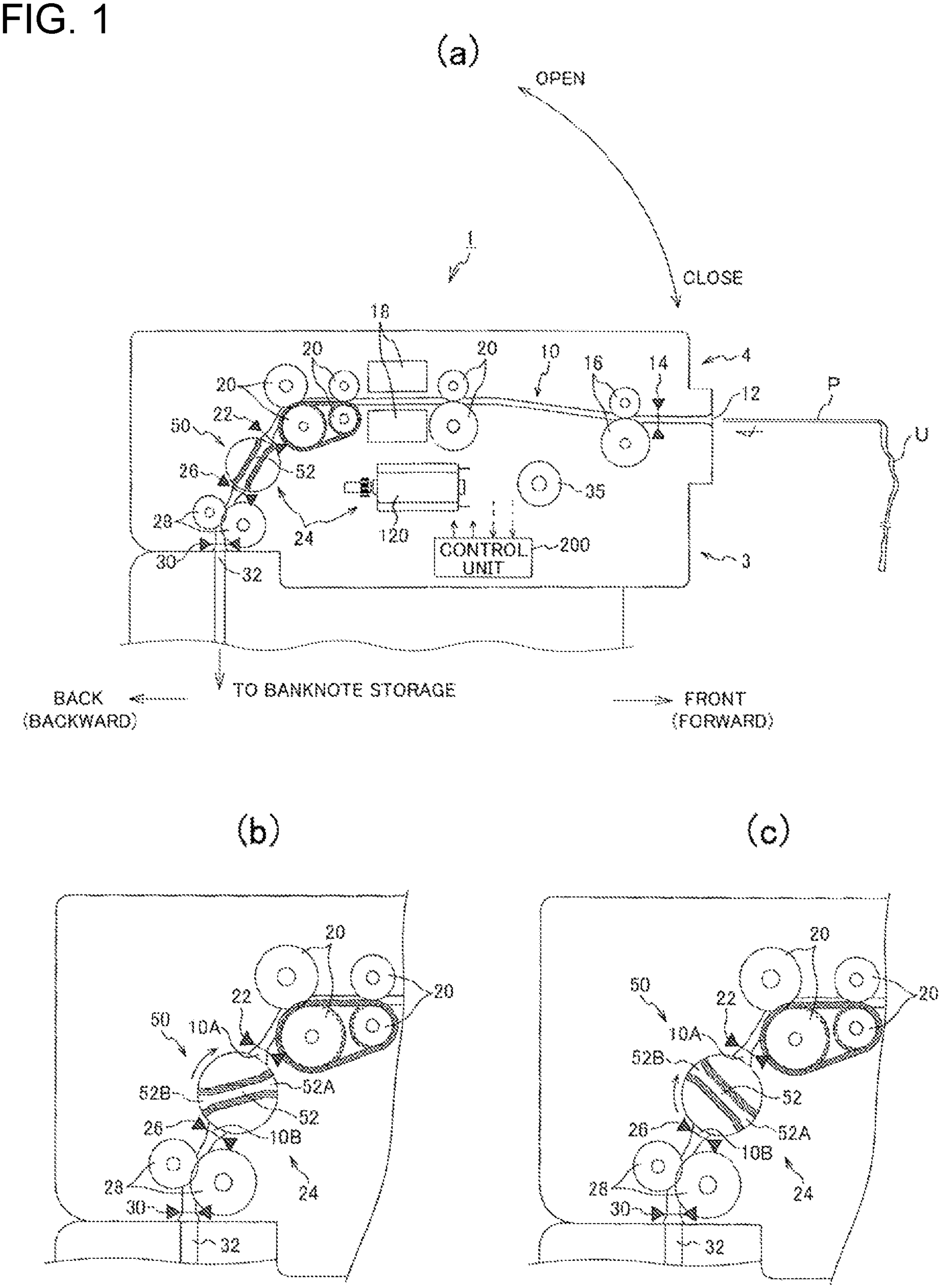
FIGS. 1(*a*), 1(*b*), and 1(*c*) are a vertical sectional view illustrating an internal configuration of a paper sheet transport device including a fraud prevention mechanism according to the present invention, and operation explanatory diagrams of relevant parts of the paper sheet transport device.

The present invention is described below in detail based on embodiments illustrated in the drawings.

Note that constituent elements, types, combinations, shapes, and relative arrangements thereof described in the following embodiments are not intended to limit the scope of the present invention solely thereto unless otherwise specified, and are only illustrative examples.

[Banknote Transport Device]

FIG. 1(*a*) is a vertical sectional view illustrating an internal configuration of the entire banknote transport device including a fraud prevention mechanism according to the present invention, and FIGS. 1(*b*) and 1(*c*) are vertical sectional views illustrating a relevant configuration of the banknote transport device, focusing on an opening/closing member. FIG. 1(*a*) illustrates an initial rotational posture in which the opening/closing member opens a transport path, FIG. 1(*b*) illustrates a non-initial rotational posture in which the opening/closing member is at a standby position, and FIG. 1(*c*) illustrates a state in which the opening/closing member blocks a passage even when the opening/closing member is rotated by an external force.

While a banknote is described as an example of a paper sheet in the present example, the present device is also applicable to prevention of a fraudulent act in transport of a paper sheet other than a banknote, such as a security, a cash voucher, and a ticket.

A banknote transport device (paper sheet transport device) 1 is used in a state of being attached to the body of a banknote handling device such as a banknote deposit machine, various vending machines, and a money changer (all not illustrated), and a banknote received in the banknote transport device 1 is subjected to recognition of authenticity and denomination of the banknote by a recognition sensor, and is then sequentially stored one by one in a cashbox in the banknote handling device.

The banknote transport device 1 includes a lower unit 3, and an upper unit 4 supported on the lower unit 3 to be capable of opening and closing, and a banknote transport route (transport route) 10 is formed between opposing surfaces of these units when the units are in a closed state illustrated in FIG. 1.

An inlet 12 for introducing a banknote P is provided at one end of the transport route 10. Inside of the inlet 12, an inlet tracking sensor 14 for detecting a banknote, an inlet roller pair 16, an optical recognition sensor 18 that reads information for recognizing denomination and authenticity of a banknote, a relay roller pair 20, a tracking sensor 22 on an inlet side of a fraud prevention mechanism, a fraud prevention mechanism 24 including an opening/closing member 50 for fraud detection, a fraud preventing motor 120, and the like, a tracking sensor 26 on an outlet side of the fraud prevention mechanism, an outlet roller pair 28, an outlet tracking sensor 30, and an outlet 32 are arranged along the transport route 10. A transport motor 35 that drives the roller pairs 16, 20, and 28 for banknote transport, and a control unit (a CPU, an MPU, a ROM, and a RAM) 200 that judges the denomination and authenticity of a banknote on the basis of the recognition information from the optical recognition sensor 18 and that controls control targets such as the transport motor 35 on the basis of a banknote detection signal from each of the tracking sensors and the outlet sensor are also arranged.

A banknote discharged from the outlet 32 is stored in a banknote storage (a stacker device, not illustrated).

The above configuration of the banknote transport device 1 is merely an example and various modifications can be performed. For example, the number of used motors, arrangement of the roller pairs, the type of the recognition sensor, and the like can be variously changed or selected.

Each of the roller pairs 16, 20, and 28 is constituted of a driving roller placed on the side of the lower unit 3 and a driven roller placed on the side of the upper unit 4, and includes a configuration of transporting a banknote while nipping both surfaces of the banknote. The optical recognition sensor 18 is a photocoupler that is constituted of a light-emitting element and a light-receiving element arranged to oppose across the transport route 10 and that can recognize an optical pattern (optical features) of a banknote by passing infrared light generated by the light-emitting element through the banknote and receiving the light by the light-receiving element. A magnetic sensor also can be used as the recognition sensor.

[Fraud Prevention Mechanism]

<Basic Configuration>

The fraud prevention mechanism according to one embodiment of the present invention is explained with reference to FIGS. 1 to 10.

Figure 2:
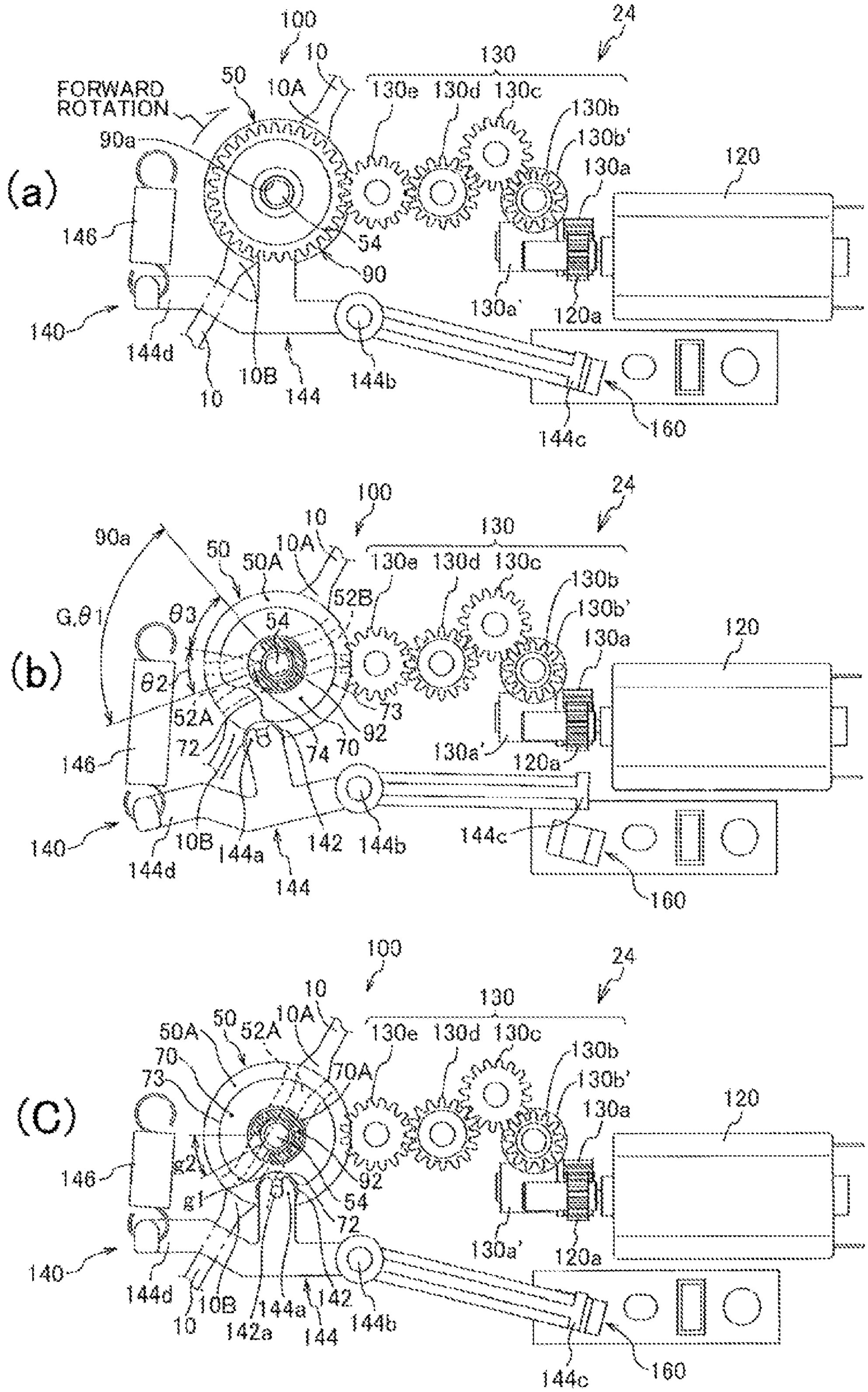
FIGS. 2(*a*), 2(*b*), and 2(*c*) are front views illustrating an example configuration and an operation procedure of the fraud prevention mechanism.
Figure 3:
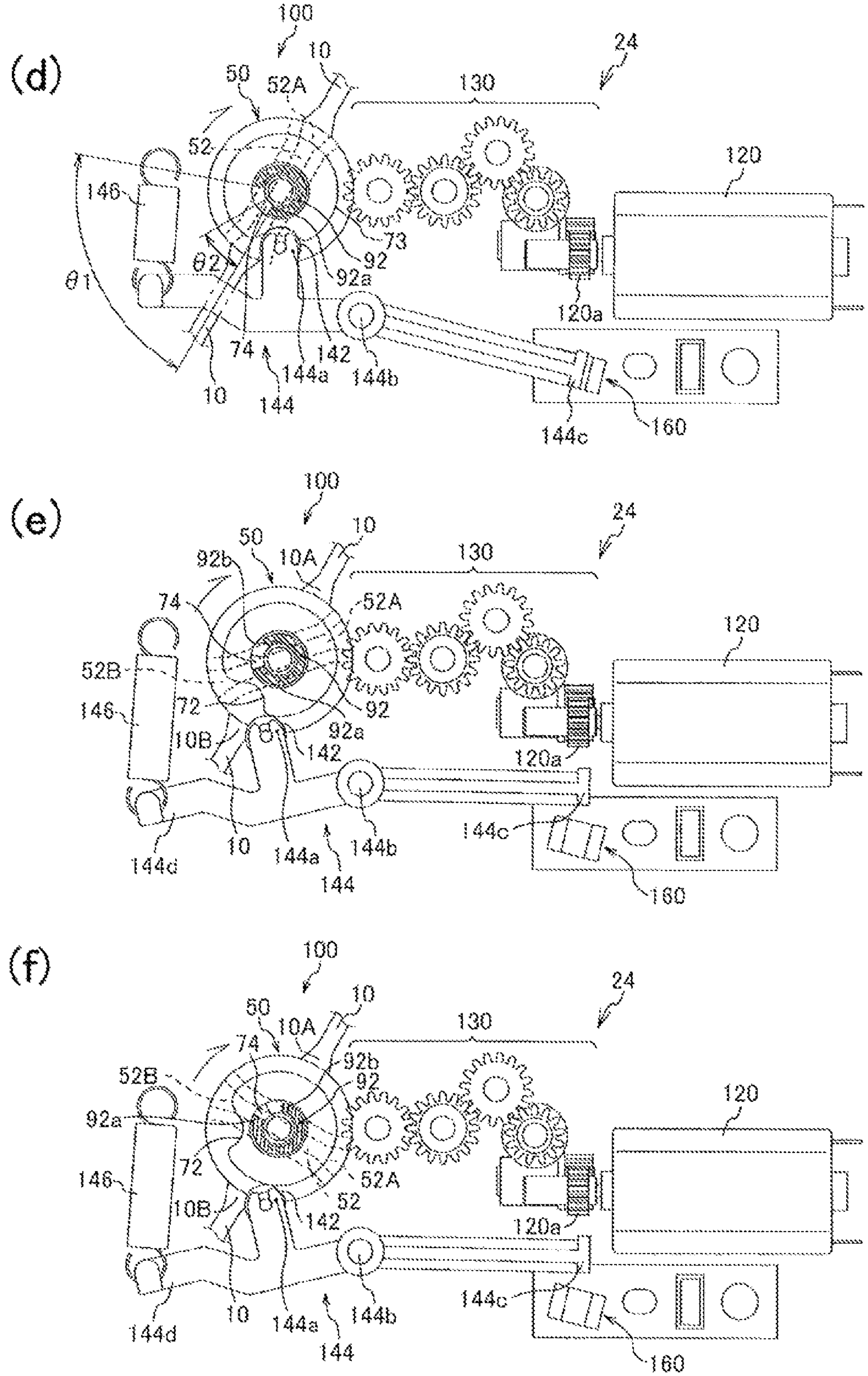
FIGS. 3(*d*), 3(*e*), and 3(*f*) are front views illustrating a continuation of the operation procedure of the fraud prevention mechanism in FIG. 2.
Figure 4:
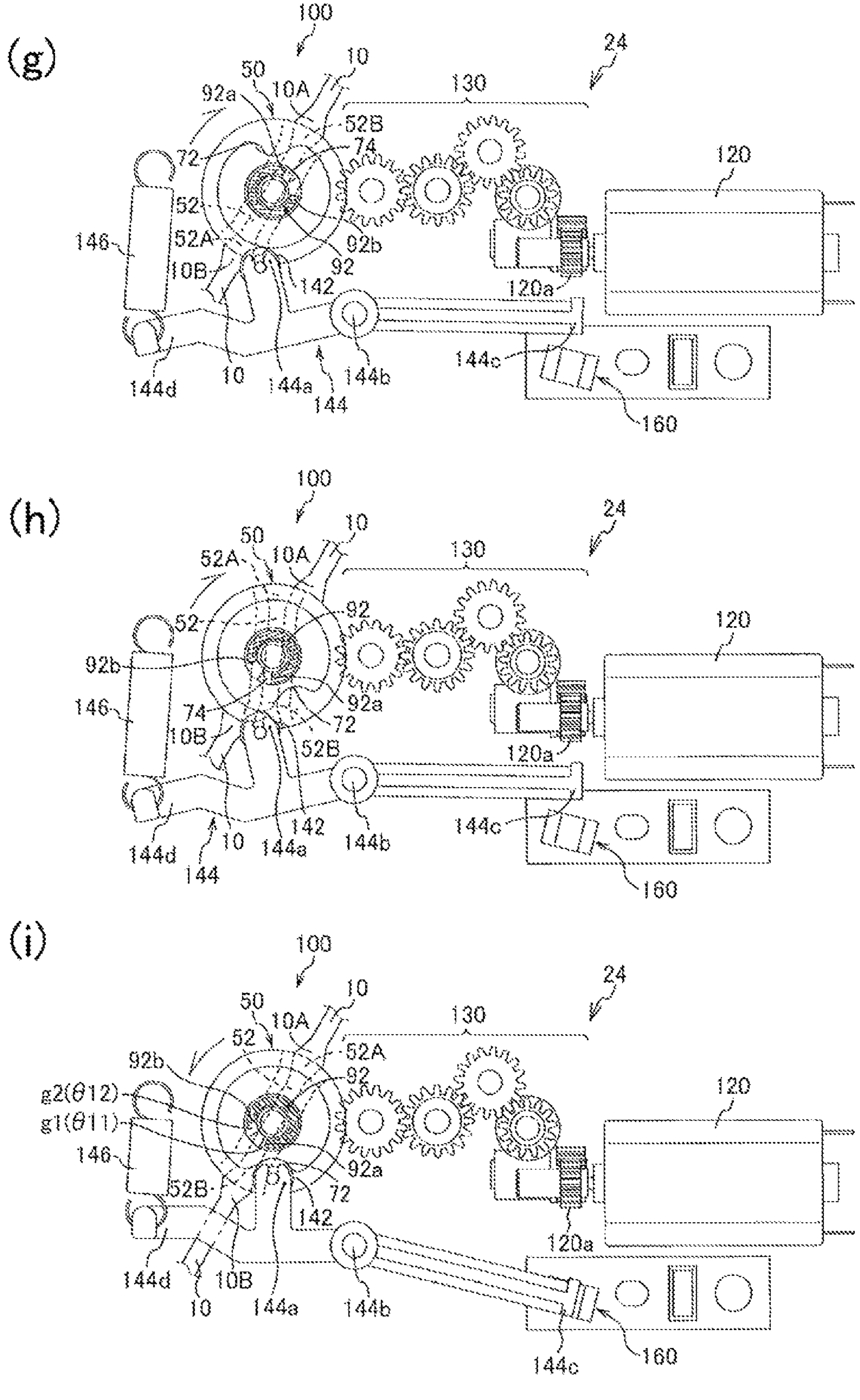
FIGS. 4(*g*), 4(*h*), and 4(*i*) are front views illustrating a continuation of the operation procedure of the fraud prevention mechanism in FIG. 3.
Figure 5:
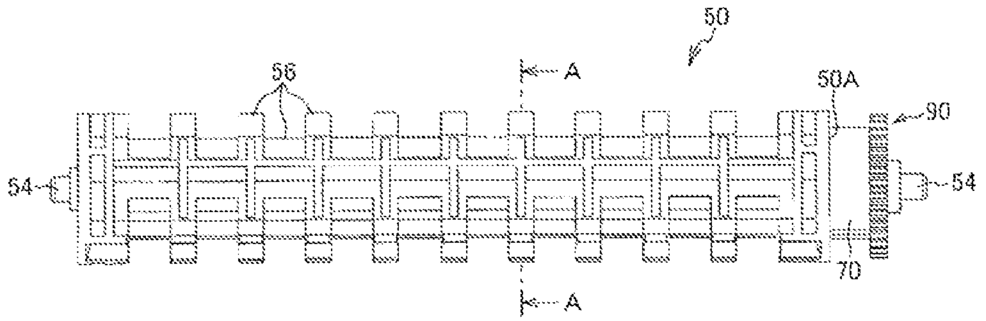
FIGS. 5(*a*), 5(*b*), and 5(*c*) are a front view illustrating an assembly state of an opening/closing member and a driving member, a front view of a state in which the driving member is detached from the opening/closing member, and a sectional view along A-A in FIG. 5(*a*), and FIG. 5(*d*) is a perspective view illustrating a configuration of the 10 opening/closing member at an end on the side of a rotary member.
Figure 5:
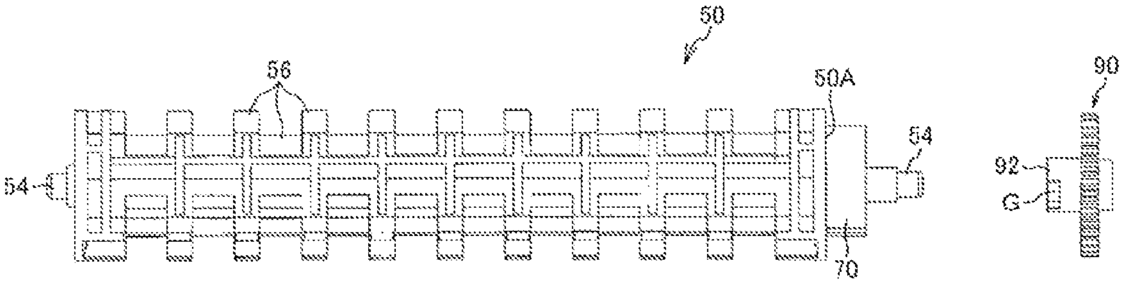
Figure 5:
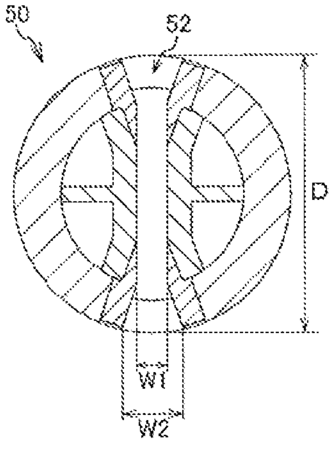
Figure 5:
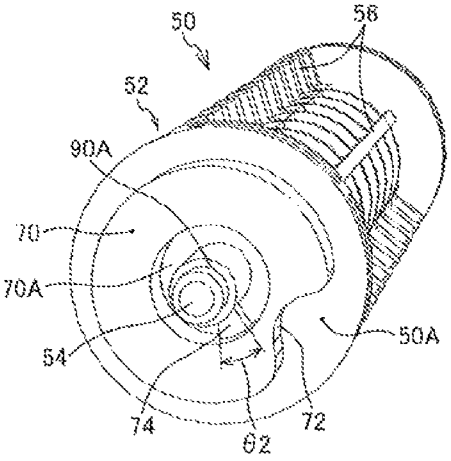
Figure 6:
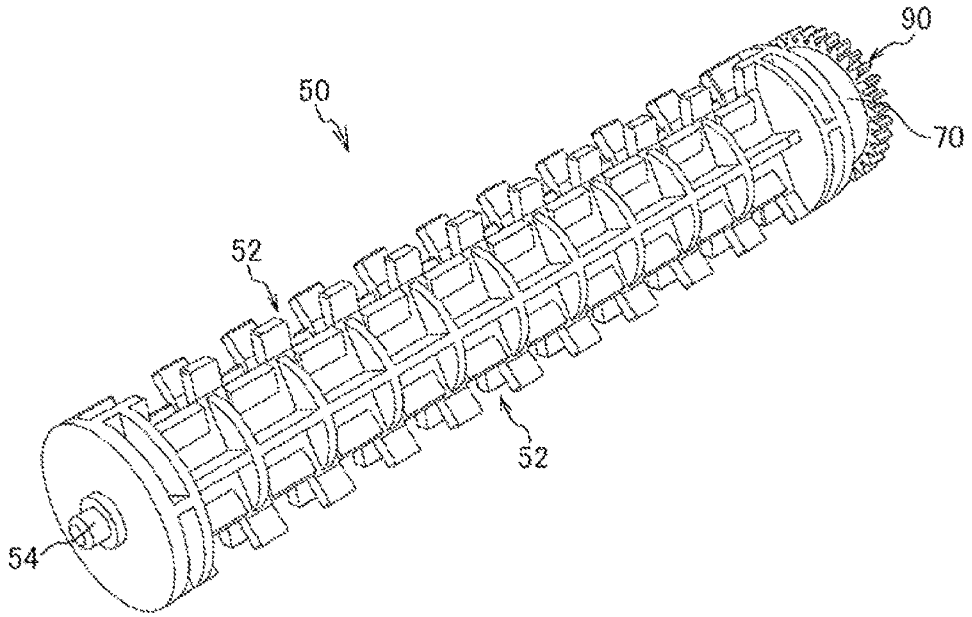
FIGS. 6(*a*) and 6(*b*) are a perspective view illustrating the assembly state of the opening/closing member and the driving member, and an exploded perspective view of the opening/closing member and the driving member.
Figure 6:
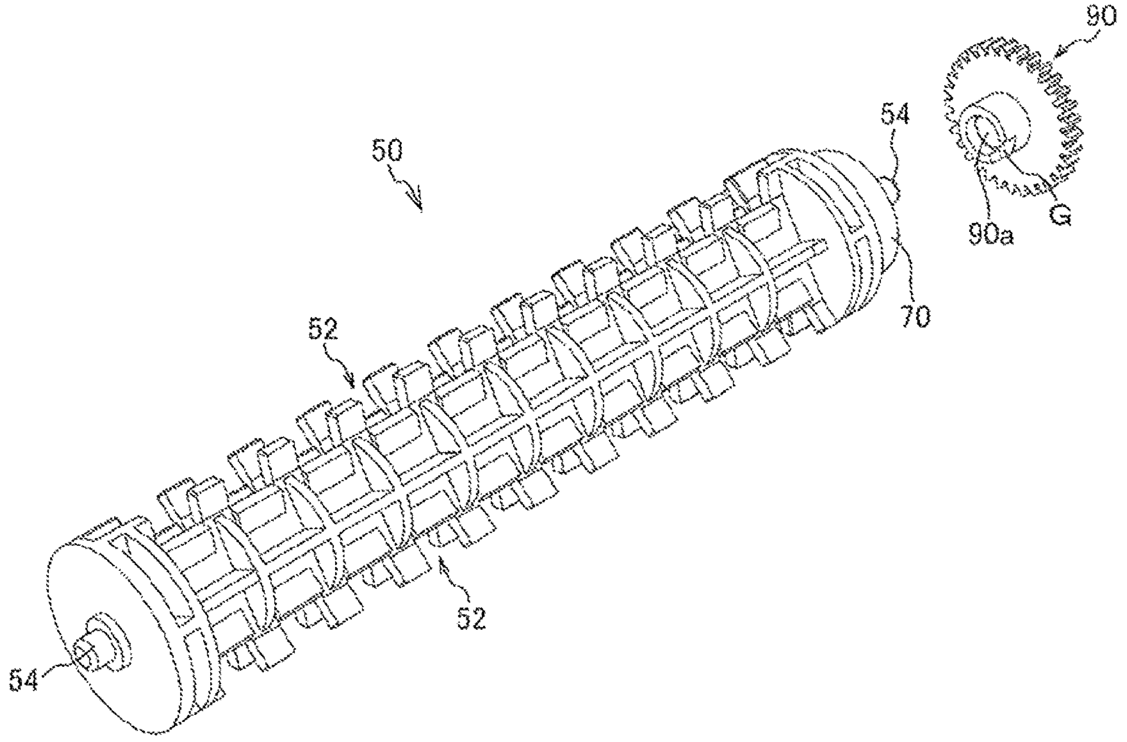
Figure 9:
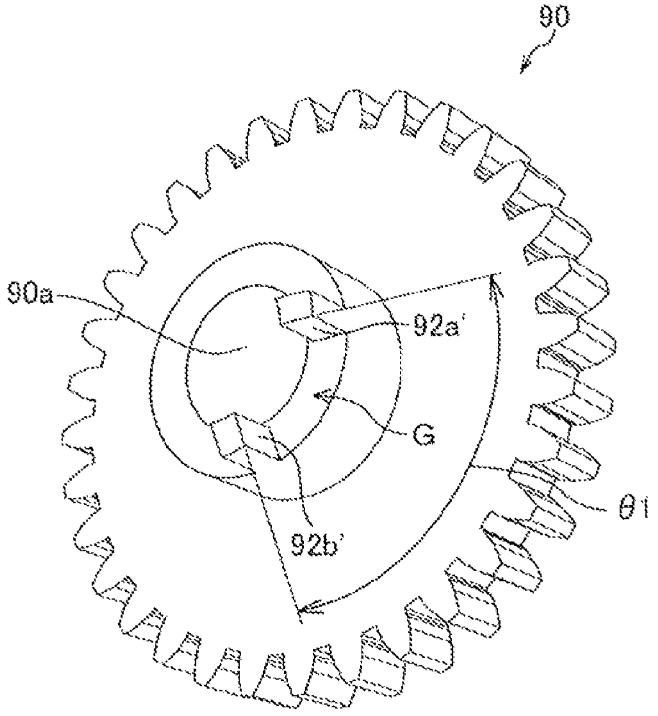
FIG. 9 is a perspective view illustrating a configuration of a driving member including a driving piece according to a modification.
Figure 10:
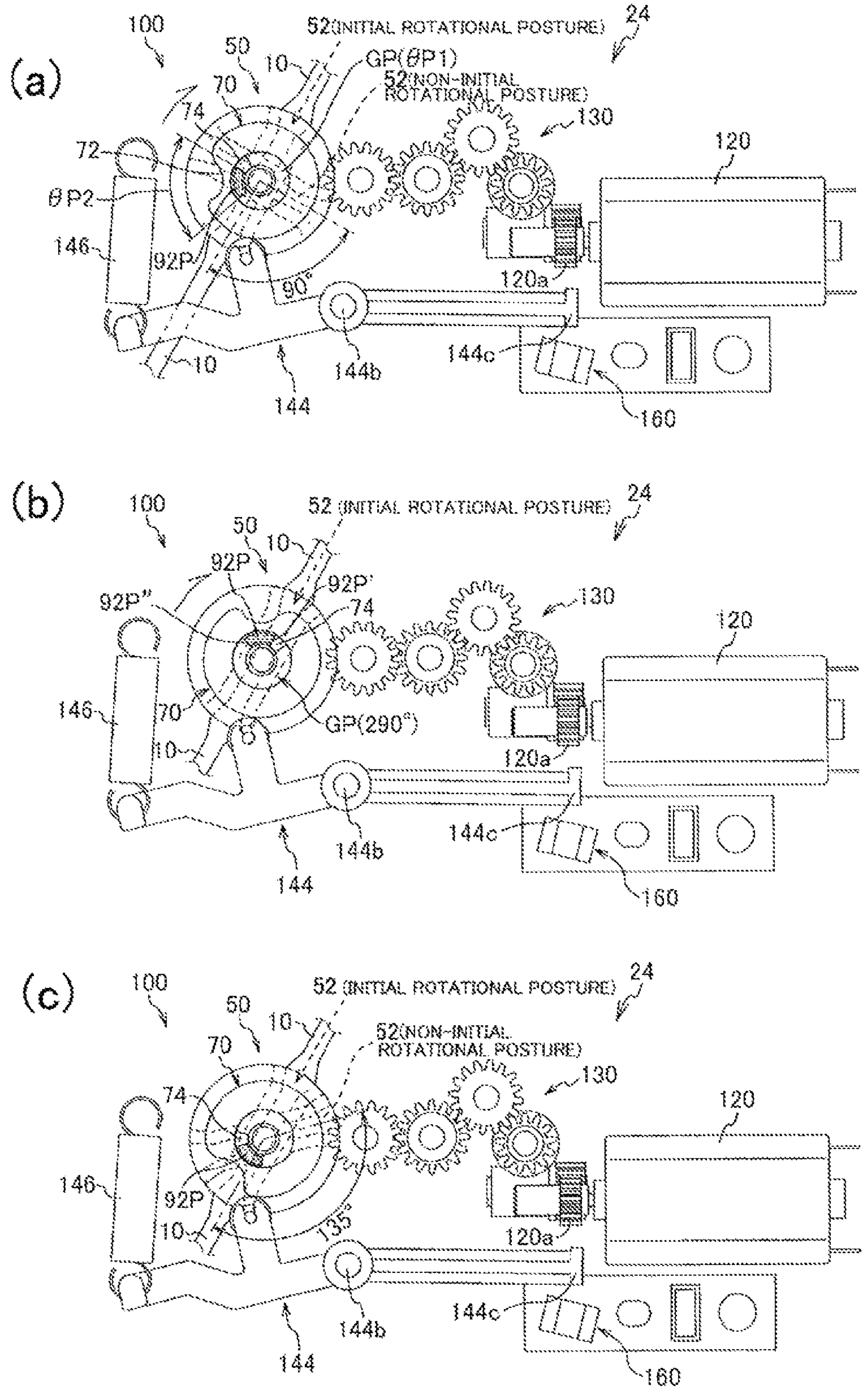
FIGS. 10(*a*) to 10(*c*) are explanatory diagrams of a possibility of a fraudulent act in the fraud prevention mechanism including a driving member having an excessive gap GP.

FIGS. 2(*a*), 2(*b*), and 2(*c*) are front views illustrating an example configuration and an operation procedure of the fraud prevention mechanism, FIGS. 3(*d*), 3(*e*), and 3(*f*) are front views illustrating a continuation of the operation procedure of the fraud prevention mechanism in FIG. 2, and FIGS. 4(*g*), 4(*h*), and 4(*i*) are front views illustrating a continuation of the operation procedure of the fraud prevention mechanism in FIG. 3. FIG. 2(*b*) illustrates a non-initial rotational posture at a standby time, and FIGS. 2(*c*) and 3(*d*) illustrate an initial rotational posture. FIGS. 5(*a*), 5(*b*), and 5(*c*) are a front view illustrating an assembly state of the opening/closing member and a driving member, a front view of a state in which the driving member is detached from the opening/closing member, and a sectional view along A-A in FIG. 5(*a*), and FIG. 5(*d*) is a perspective view illustrating a configuration of the opening/closing member at an end on the side of a rotary member. FIGS. 6(*a*) and 6(*b*) are a perspective view illustrating the assembly state of the opening/closing member and the driving member, and an exploded perspective view of the opening/closing member and the driving member, FIGS. 7(*a*) and 7(*b*) are perspective views illustrating a configuration of the driving member according to one embodiment of the present invention, and FIG. 8 is a perspective view illustrating a configuration of a conventional driving member for comparison. FIG. 9 is a perspective view of a driving member according to a modification. FIGS. 10(*a*) to 10(*c*) are explanatory diagrams illustrating a procedure (a possibility) of a fraudulent act in the fraud prevention mechanism including a driving member having an excessive gap GP.

The fraud prevention mechanism 24 is a mechanism that is installed on the transport route 10 to prevent a fraudulent act on a banknote or a fraudulent act using a banknote. That is, the fraud prevention mechanism 24 is a fraud detecting and preventing mechanism that detects fraudulent means U for extraction being fixed to a banknote P input from the inlet 12 and transported along the transport route 10, and that prevents banknote extraction using the fraudulent means U. The fraud prevention mechanism 24 also can prevent various types of fraudulent acts, such as abstraction of banknotes, which are performed without being detected by the control unit 200 of the banknote transport device 1.

The fraud prevention mechanism 24 includes an opening/closing member 50 for fraud detection and fraud prevention, which includes a guide slit 52 that has a shutter function to bring the transport route 10 to an open state to allow entry or pass of a transported banknote when in the initial rotational posture (a banknote accepting posture) illustrated in FIGS. 1(*a*), 2(*c*), and 3(*d*), and to close the whole or a part of the transport route 10 (end openings 10A and 10B) to block (disable) pass of a banknote when in non-initial rotational postures (FIGS. 1(*b*), 1(*c*), 2(*b*), 3(*e*), 3(*f*), and the like) out of the initial rotational posture, and which is axially supported to be rotatable on a rotation shaft 54 parallel to the guide slit 52. The fraud prevention mechanism 24 further includes a rotary member 70 that is a substantially discoid body having a shaft core fixed by one end of the rotation shaft 54 of the opening/closing member 50, and that has one recessed portion 72 on an outer circumferential edge to integrally rotate with the opening/closing member 50, a driving gear (a driving member) 90 for driving the opening/closing member, that is arranged closely to the rotary member 70 to oppose an outer side surface thereof and that has a shaft core axially supported by one end of the rotation shaft 54 of the opening/closing member to be capable of relatively rotating and to be coaxial with the rotary member, a drive transmission mechanism 100 that operates to intermittently transmit a drive force from the driving gear 90 to the rotary member 70 at predetermined timings, a fraud preventing motor (a DC motor) 120 that drives the driving gear 90, a gear mechanism 130 that transmits a drive force between the fraud preventing motor 120 and the driving gear 90, a rotational-posture detecting unit 140 that detects that the opening/closing member 50 is in the initial rotational posture or is not in the initial rotational posture, and the control unit 200 that controls the fraud preventing motor 120.

The rotation shaft 54 is merely protruded from both ends of the rotary member and does not extend in the guide slit 52 inside the rotary member. Therefore, the rotation shaft 54 is in a positional relation not interfering with the guide slit as illustrated in FIG. 5(*c*).

As illustrated in FIGS. 2, 5(*c*), and the like, the guide slit 52 has a shape allowing pass of a banknote having been transported in a downward direction along the transport route 10, and is configured to allow smooth pass only when in the initial rotational posture (an initial rotational angle) illustrated in FIGS. 1(*a*), 2(*c*), and 3(*d*) and to block pass of a banknote when the rotational posture (the rotation angle) is deviated to bring the both end openings 52A and 52B of the guide slit to a non-communicated state with the transport route 10 as illustrated in FIGS. 1(*b*), 1(*c*), and 2(*b*).

The guide slit is not essential, and an opening/closing member itself that does not have the guide slit may open or close the transport route in the course of rotating or a cutout may be formed on an opening/closing member to cause the cutout to open the transport route only when the opening/closing member is in the initial rotational posture.

A recessed and projected portion 56 (FIGS. 5 and 6) formed along a side edge of the opening/closing member 50 in the longitudinal direction is configured to engage with a corresponding recessed and projected portion provided on a cover member of the device body arranged on the outer diameter side of the opening/closing member 50, and a small recessed and projected clearance is formed between these recessed and projected portions. The recessed and projected clearance functions to enable the extraction means U fixed to a banknote to be easily twined and caught by the outer circumference of the opening/closing member when the opening/closing member rotates in a state in which the extraction means is in the guide slit 52. When the extraction means U winds around the opening/closing member 50, rotation of the opening/closing member 50 is hindered by the extraction means. In this case, an abnormality in a pulse from a rotary encoder (not illustrated) provided on an output shaft of the fraud preventing motor 120, or the like occurs, or a decrease in the rotation speed of the opening/closing member 50 relative to a rotation speed set as a reference value can be detected by a home-position detecting sensor 160. Therefore, it is possible to determine that a fraudulent act is being performed. The present embodiment relies only on a result of the detection by the home-position detecting sensor 160. This point will be described in detail later.

The drive transmission mechanism 100 according to the configuration example illustrated in FIGS. 2 to 7 includes a driven piece 74 being one small projection provided on the rotary member 70, and a driving piece 92 as a C-shaped projection (a protruded rim) provided on the driving gear 90, and causes the driven piece 74 (a circumferential angle θ2=30 degrees) to fit in a gap G (a circumferential angle θ1=70 degrees) of the driving piece 92 to be capable of relatively moving in the circumferential direction with respect to the driving piece. A circumferential backlash θ3 that allows relative rotation between the driven piece 74 and the driving piece 92 is provided between these pieces 74 and 92. In other words, the circumferential backlash θ3 that allows independent rotational movement of the driven piece with respect to the driving piece that is stopped rotating is provided between the driven piece and the driving piece.

The value (θ1−θ2=40 degrees) of the circumferential backlash θ3 between the driven piece 74 and the driving piece 92 is set to a value (a fraud prevention value) that can prevent the opening/closing member from being rotated by a required angle to transition to the initial rotational posture by an operation of fraudulent means inserted through the paper-sheet transport route from outside when the opening/closing member is stopped in a non-initial rotational posture at a standby time as illustrated in FIGS. 1(*b*) and 2(*b*). Since the value of the circumferential backlash θ3 is thus configured in the present invention, the opening/closing member can be rotated only to a non-initial rotational posture in FIGS. 1(*c*) and 3(*f*) even when the opening/closing member in a non-initial rotational posture at a standby time in FIGS. 1(*b*) and 2(*b*) is forwardly rotated at a maximum using fraudulent means from outside.

In other words, if the circumferential backlash θ3 between the driven piece 74 and the driving piece 92 is substantially the same as or larger than an angle that enables the opening/closing member in a non-initial rotational posture at a standby time to be actually rotated to the initial rotational posture (a communicated position), a fraudulent act for bringing the guide slit of the opening/closing member to a communicated state with the transport route is possible.

That is, on the premise that the driving gear 90 is stopped rotating at a standby time, a fraudulent act for bringing the opening/closing member to a state communicated with the transport route is possible when a condition "an angle required for the opening/closing member to reach the initial rotational posture from a non-initial rotational posture at a standby time"≤"the circumferential backlash θ3" is met.

The above numerical values cited as the circumferential angles θ1 and θ2 and the value θ3 of the circumferential backlash are merely an example.

That is, the drive transmission mechanism 100 includes the driven piece 74 being the small projection (the circumferential angle (width) θ2) that is provided on the outer side surface of the rotary member 70 and that is protruded outward in the axial direction, and the driving piece 92 as a C-shaped projection (protruded rim) as viewed in the axial direction, which is provided on the inner side surface (a surface opposing the rotary member) of the driving gear 90 and which directly presses the driven piece 74 in the circumferential direction (the forward rotation direction) at a predetermined timing in the course of relatively rotationally moving with respect to the driven piece 74 to rotationally drive the rotary member 70 at a predetermined timing. The positional relation between the rotary member 70 and the driving gear 90 is set to enable the driven piece 74 to be always fitted in the gap G of the driving piece 92.

The angular range θ3 in which the driving gear 90 can relatively rotate with respect to the rotary member 70 is the value (40 degrees) of a difference obtained by subtracting the circumferential angle θ2 (30 degrees in this example) of the driven piece 74 from the circumferential angle θ1 (the circumferential width and 70 degrees in this example) of the gap G provided on the driving piece 92.

Whether the fraudulent act described above is possible does not depend only on the circumferential backlash angle θ3 but depends on a relation with a stop position (a stop angle) at a time when the opening/closing member is in a non-initial rotational posture. That is, as described later, the stop position of the opening/closing member at a time when it is in a non-initial rotational posture, and the circumferential backlash angle θ3 have a close relationship. Therefore, the numerical value being 40 degrees of the circumferential backlash angle is merely one example on the premise of a case in which the stop position (the stop angle) of the opening/closing member that is in a non-initial rotational posture in a standby state is a predetermined position (a predetermined angle).

The illustrated driving piece 92 has a C-shape in which a part of a side wall of a cylindrical projection (protruded rim) is cut out. One inner wall (forward-rotation inner wall) 92*a* presses the driven piece 74 when the driving gear forwardly rotates (rotates in the clockwise direction), and the other inner wall (reverse-rotation inner wall) 92*b* presses the driven piece when the driving gear reversely rotates.

However, this is merely an example, and two projections 92*a*' and 92*b*' corresponding to the inner walls 92*a* and 29*b* may be provided in a protruded manner on the inner surface of the driving gear 90 to oppose each other with the predetermined circumferential gap G interposed therebetween as illustrated in a modification in FIG. 9, without configuring the driving piece 92 in a C-shape.

As illustrated in FIG. 5(*d*), the rotary member 70 is a substantially-discoid (annular) protruded portion concentrically integrated with one outer side surface 50A of the opening/closing member 50, and the recessed portion 72 is formed on the outer circumferential edge thereof. The driven piece 74 being fan-shaped and having the circumferential angle (the circumferential width) 02 is provided in a protruded manner in a circular (annular) depressed portion 70A provided at a central portion of the outer side surface of the rotary member 70. The rotation shaft 54 penetrates through the central portion of the depressed portion 70A to be provided outward in a protruded manner in the axial direction. When the driving gear is assembled to cause the inner surface to oppose the outer side surface 50A of the opening/closing member, the driving piece 92 of the driving gear 90 is fitted in the depressed portion 70A. The rotation shaft 54 is inserted through a through-hole 90*a* at the central portion of the driving gear 90 to axially support the driving gear to be capable of relatively rotating.

As the driving member 90, a pulley may be used instead of the driving gear.

The control unit 200 includes a judging unit that receives an output of the optical recognition sensor 18 to determine whether a banknote is genuine, continues to forwardly drive the transport motor 35 after determining that the banknote is genuine and receiving an output of the outlet sensor 30, and reversely rotates the transport motor 35 to return a banknote to the inlet 2 when the banknote is not determined to be genuine, and a comparison unit that compares a reference rotation time and/or a reference rotation speed with an actual rotation time and/or an actual rotation speed of the opening/closing member 50 and issues an alarm output when the actual rotation time and/or the actual rotation speed is out of the reference range.

Figure 11:
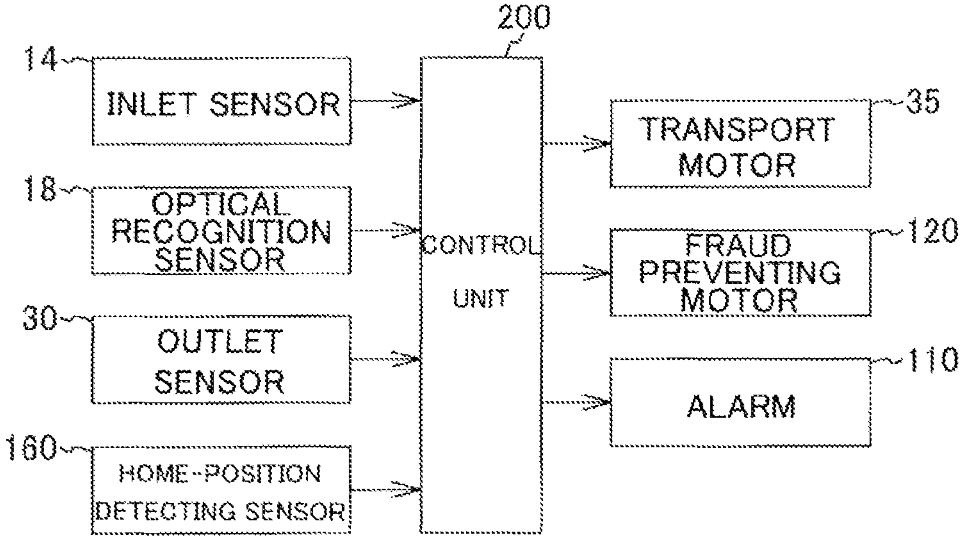
FIG. 11 is a block diagram of a control unit.

As illustrated in a block diagram of the control unit of FIG. 11, the inlet sensor 14, the optical recognition sensor 18, the outlet sensor 30, and the home-position (initial rotational posture) detecting sensor 160 are connected to input terminals of the control unit 200. The transport motor 35, the fraud preventing motor 120, and an alarm 110 are connected to output terminals of the control unit 200. The control unit 200 can determine whether there is a change in the rotation speed of the fraud preventing motor 120 on the basis of information on a required time from moving out of the home position (hereinafter, "home-out") to returning to the home position (hereinafter, "home-in") detected by the home-position detecting sensor 160. That is, the control unit only monitors timeout of an abnormality judgement condition, that is, whether the total required time from home-out to home-in when the opening/closing member 50 has been rotated n times is longer than a set reference time.

The control unit 200 executes various types of control, such as turning off the fraud preventing motor 120 while the home-position detecting sensor 160 is detecting that the guide slit 52 is in the initial rotational posture, and forwardly driving the fraud preventing motor 120 to cause the opening/closing member 50 to transition to the initial rotational posture using the driving gear 90 when it is detected that the guide slit 52 is in a non-initial rotational posture out of the initial rotational posture. In the present embodiment, at the time of waiting banknote reception, the fraud preventing motor is turned off in a state in which the opening/closing member 50 is caused to transition to a non-initial rotational posture that is a posture forwardly rotated by 40 degrees from the initial rotational posture in FIG. 2(*c*), as illustrated in FIG. 2(*b*).

In a non-initial rotational posture, it is preferable that the two end openings 52A and 52B of the guide slit are in a completely non-communicated state in which the end openings 52A and 52B are completely isolated from the end openings 10A and 10B of the transport route 10 as illustrated in FIGS. 2(*b*), 3(*e*), 3(*f*), and the like. If the end openings of the guide slit are not completely isolated from the end openings of the transport route 10 but are slightly communicated therewith although the opening/closing member is in a posture out of the initial rotational posture, a fraudulent act, such as inserting fraudulent means inside the guide slit using a small clearance formed due to the incomplete communicated state may be possible. In that sense, a non-initial rotational posture that structurally enables a fraud by insertion of fraudulent means from a small clearance due to a cause such as slight communication of the end openings of the guide slit with the transport route 10 is undesirable.

FIG. 2(*b*) illustrates a state in which the opening/closing member 50 is forwardly rotated by 40 degrees from the initial rotational posture in FIG. 2(*c*), and FIGS. 3(*f*), 4(*g*), and 4(*h*) illustrate states in which the opening/closing member 50 is forwardly rotated by 90 degrees, 180 degrees, and 235 degrees from the initial rotational posture, respectively.

The gear mechanism 130 includes a plurality of relay gears 130*a* to 130*e* that are arranged on a drive transmission route between an output gear 120*a* of the fraud preventing motor 120 and the driving gear 90 to sequentially mesh with each other, and the like. The relay gear 130*a* that meshes with the output gear 120*a* of the motor integrally includes a worm 130*a*' and the worm 130*a*' meshes with a worm wheel 130*b*'. The relay gear 130*b* is integrated with the worm wheel 130*b*' and the relay gear 130*b* meshes with the relay gear 130*c*.

By using a worm gear constituted of a worm and a worm wheel as each of the two gears constituting the gear mechanism 130, forward rotation and reverse rotation of the driving gear caused by driving from a load during stopping of the fraud preventing motor are both disabled.

However, the opening/closing member can be forwardly rotated with respect to the driving gear in a stopped state by a difference (the circumferential backlash θ3) between the circumferential angle θ1 of the gap G of the driving piece 92 and the circumferential angle θ2 of the driven piece 74 by an operation from outside. That is, the opening/closing member can be fraudulently forwardly rotated by the circumferential backlash. Therefore, if the circumferential backlash value θ3 (θ1-θ2) is substantially the same as or larger than a value (a fraudulent-act prevention value) that enables prevention of a fraudulent act, a fraudulent act of causing the opening/closing member in a non-initial rotational posture to transition to the initial rotational posture by forwardly rotating the rotary member within the angle range is possible.

In other words, with satisfaction of the above condition determining success or failure of a fraudulent act: "an angle required for the opening/closing member to reach the initial rotational posture from a non-initial rotational posture at a standby time"≤"the circumferential backlash θ3", the guide slit 52 and the transport route 10 are brought to a communicated state (including a partially-communicated state as well as a completely-communicated state).

That is, the stop position (stop angle) of the opening/closing member when the opening/closing member in a non-initial rotational posture and the circumferential backlash angle θ3 are in an inextricable relation and the numerical value of 40 degrees of the circumferential backlash angle is a numerical value on the premise that the non-initial rotational posture is at a predetermined stop angle.

Meanwhile, when a worm gear is not interposed in the drive-force transmission route of the gear mechanism 130, the driving gear is in a state of being capable of forwardly and reversely rotating. Therefore, the opening/closing member can be freely forwardly and reversely rotated by an operation from outside and a fraudulent act of causing the opening/closing member in a non-initial rotational posture to transition to the initial rotational posture is much easier.

The rotational-posture detecting unit 140 includes a roller (a following member) 142 constituted of a rotatable roller that engages with the recessed portion 72 of the rotary member 70 and stops when the guide slit 52 of the opening/closing member 50 is in the initial rotational posture, and that leaves the recessed portion 72 to move along an outer circumference edge (a non-recessed portion) 73 of the rotary member when the guide slit (the rotary member) transitions from the initial rotational posture illustrated in FIGS. 1(*a*) and 2(*c*) to the non-initial rotational posture illustrated in FIGS. 1(*b*) and 3(*e*), a lever 144 that supports a shaft 142*a* of the roller with a support portion 144*a* to be rotatable thereon and that swings the roller on a shaft portion 144*b* provided on another portion toward the outer circumferential edge of the rotary member along a surface orthogonal to the rotation shaft 54, a lever-biasing elastic member 146 that elastically biases the lever 144 in a direction in which the roller 142 is pressed against the outer circumferential edge of the rotary member, and the home-position detecting sensor 160 that detects the guide slit 52 is in the initial rotational posture by detecting a detectable portion 144*c* provided on the lever only when the roller 142 is completely fitted (sunk) in the recessed portion 72.

The lever-biasing elastic member (lever biasing member) 146 is a coil spring in this example and has one end locked to a fixed portion of the device and the other end locked to the other end portion of the lever. The lever-biasing elastic member 146 always biases the roller 142 supported on the support portion 144*a* that swings along a rotational movement trajectory around the shaft portion 144*b* toward the outer circumferential edge 73 of the lever rotary member 70.

The rotatable roller 142 as a following member is merely an example, and may have a configuration that does not rotate as long as it is a member capable of smoothly moving on the outer circumferential edge of the rotary member because the frictional resistance is small.

The driving gear (driving member) 90 has a configuration to relatively rotate on the rotation shaft 54 with respect to the rotary member 70 coaxially coupled by the rotation shaft 54, and drives the rotary member 70 by pressing the driven piece 74 in the forward rotation direction with one inner wall (forward-rotation inner wall) 92*a* of the driving piece 92 in the course of forward rotation (rotation in the clockwise direction in FIG. 2) of the driving gear (FIGS. 2 and 3). While the rotary member 70 is forwardly driven by the driving gear 90, the rotary member is quickly speeded-up and sinks in the recessed portion 72 due to a biasing force of the lever biasing member 146 in the course in which the roller 142 supported by the lever 144 is fitted in the recessed portion 72 of the rotary member 70 from the outer circumferential edge 73 of the rotating member.

Accordingly, the driven piece 74 is brought to a circumferential positional relation ahead of and separate from the inner wall 92*a* of the driving piece 92 by an angle θ11 corresponding to a gap g1 (see FIG. 4(*h*)→4(*i*)).

In other words, when the roller 142 is fitted in the recessed portion 72, the rotary member 70 is quickly speeded-up from the rotation speed of the rotary member that has been driven until then by the driving gear, due to the force of the lever biasing member 146. Therefore, the gap g1 (FIG. 4(*i*)) as a deceleration section is formed in the circumferential direction between the driven piece 74 and the inner wall 92*a*.

The opening/closing member 50 mechanically stops the rotation due to fitting of the spring-biased roller 142 in the recessed portion 72 of the rotary member 70.

The circumferential gap g1 between the driven piece 74 and the inner wall 92*a* of the driving piece at a time when the opening/closing member 50 has stopped functions as the deceleration section at the time of forward rotation of the driving gear. That is, the control unit 200 stops driving of the fraud preventing motor 120 in response to detection of the detectable portion 144*c* of the lever by the home-position detecting sensor 160 at a time when the roller is completely sunk in the recessed portion as illustrated in FIG. 4(*i*). Accordingly, at a time when the rotary member 70 is stopped in the initial rotational posture by being locked by the roller, the driving gear 90 (the inner wall 92*a* of the driving piece) is at a position separated from the driven piece 74 by a distance (the angle θ11) of the deceleration section g1, and does not hit the driven piece 74 to cause overrun. After the rotary member is stopped, the driving gear 90 continues the rotational movement in the range of the deceleration section g1 based on inertia (its own momentum) of the fraud preventing motor.

That is, during a period in which the inner wall 92*a* of the driven piece rotationally moves alone in the deceleration section after the rotation of the rotary member 70 is stopped by stop of the fraud preventing motor 120, the rotary member 70 locked by the roller can maintain a stopped state in the initial rotational posture. Furthermore, since the inertia force of the driving gear 90 reduces and the speed thereof is decreased in the course of movement of the inner wall 92*a* toward the driven piece 74 in the deceleration section, the possibility of hit against the driven piece 74 to cause overrun is decreased. Even if the inner wall 92*a* having moved in the deceleration section is brought into contact with the driven piece, the opening/closing member can maintain the stopped state in the initial rotational posture when there is no more momentum causing overrun of the driven piece. Therefore, the opening/closing member 50 is positioned to enable the guide slit 52 to be in the initial rotational posture to open the transport route.

When "the backlash angle θ3"≥"the angle θ11 of the gap g1 produced at the time of braking at the home position", the inner wall can be stopped at the home position without causing overrun.

A procedure of forming the deceleration section and the function thereof are explained in more detail. When the roller 142 is fitted in the recessed portion 72, the opening/closing member (the driven piece 74) rotationally moves ahead the driving gear 90 (the inner wall 92*a* of the driving piece) and the circumferential gap g1 is formed between the driven piece 74 and the inner wall 92*a* as illustrated in FIG. 4(*i*). That is, since the output from the home-position detecting sensor 160 is changed from "1" to "0" in the state illustrated in FIG. 4(*i*), the operation of the fraud preventing motor 120 is stopped. In the state in which the operation of the fraud preventing motor 120 is stopped, the inertial forces of the fraud preventing motor 120 and the gear mechanism 130 decrease while the driven piece 74 rotates by the circumferential length of the gap g1. At a time when the driving gear and the opening/closing member are stopped, the inner wall 92*a* does not abut on the driven piece 74 and the gap g1 remains as illustrated in FIG. 4(*i*). Accordingly, the opening/closing member 50 can be reliably kept in the initial rotational posture illustrated in FIG. 2(*c*) without an impact force from the inner wall 92*a* applied to the driven piece 74. Therefore, the guide slit 52 of the opening/closing member is positioned at an initial position aligned with the banknote transport route 10.

A difference of a driving gear 90P according to a comparative example of FIG. 8 from the driving gear 90 of the present invention is explained next with reference to operation explanatory diagrams of FIGS. 10(*a*) and 10(*b*). That is, as explained in the background, an angle (a circumferential backlash) obtained by subtracting a circumferential angle $\theta$P2 of the driven piece 74 from a circumferential angle $\theta$P1 of a gap GP of a driving piece 92P is conventionally set to a large value, for example, equal to or larger than 180 degrees from the viewpoint of effectively preventing overrun. The circumferential angle $\theta$P1 of the gap GP of the conventional driving gear 90P illustrated in a comparative example of FIG. 8 is 290 degrees, the circumferential angle $\theta$P2 of the driven piece 74 is 30 degrees, and the circumferential backlash $\theta$P1-$\theta$P2 is 260 degrees. However, when the gap GP has such an excessive width, the driven piece 74 (the opening/closing member 50) can be relatively rotated in the forward rotation direction in a wide angular range toward the stopped driving piece 92P within the range of the excessive circumferential backlash. Accordingly, even when the posture (angle) of the guide slit 52 is a non-initial rotational posture rotated by about 90 degrees in the clockwise direction with respect to the guide slit 52 in the initial rotational posture as illustrated in FIG. 10(*a*), the guide slit 52 can be caused to transition to the initial rotational posture illustrated in FIG. 10(*b*) only by forwardly rotating the opening/closing member by a small angle (about 90 degrees) by an operation using fraudulent means from outside.

When the posture (angle) of the guide slit 52 is a non-initial rotational posture that is rotationally moved in the clockwise direction by 45 degrees with respect to the guide slit in the initial rotational posture illustrated in FIG. 10(*b*), as illustrated in FIG. 10(*c*), the guide slit can be caused to transition to the initial rotational posture illustrated in FIG. 10(*b*) only by forwardly rotating the opening/closing member by 135 degrees using fraudulent means.

The present inventors have found that the following conditions (1) and (2) need to be met to prevent an act of fraudulently rotating the opening/closing member in a standby posture while preventing overrun.

(1) A condition to rotate only the opening/closing member to prevent the guide slit and the transport route from being brought to a communicated state at a standby time when the driving gear is stopped: "the rotation angle required to cause the opening/closing member in a non-initial rotational posture at a standby time to transition to the initial rotational posture">"the backlash angle $\theta$3"

(2) A condition to prevent overrun at the home position: "the backlash angle $\theta$3"≥"the angle $\theta$11 of the gap g1 at the time of home braking"

In the embodiment of the present invention, the backlash angle $\theta$3 is set to 40 degrees in consideration of a balance between the conditions (1) and (2) (considering also the stop positions in non-initial rotational postures).

In the state illustrated in FIGS. 2(*b*) and 3(*f*), the both end openings of the guide slit are in a completely non-communicated state with the transport route, and it is impossible to cause fraudulent means to access the downstream side of the rotary member through the inside of the guide slit. However, for example, in a case illustrated in FIG. 4(*h*), the both end openings of the guide slit are partially communicated with the transport route 10, and there is a risk that fraudulent means can be inserted into the guide slit using a small communicated portion to perform a fraudulent act on the banknote storage positioned downstream. Therefore, to completely prevent a fraudulent access to the banknote storage by rotating the opening/closing member, an act of causing the both end openings of the guide slit to be incompletely (partially) communicated with the transport route also needs to be prevented. From this viewpoint, an appropriate value of the circumferential backlash $\theta$3 ($\theta$1-$\theta$2) between the driving piece 92 and the driven piece 74 is in the range of 40 degrees to 60 degrees (these values are merely an example).

In order to explain this in more detail, it is preferable that the circumferential backlash $\theta$3 between the driving piece 92 and the driven piece 74 is zero in order to accelerate the rotational operation of the opening/closing member 50 to address speed-up of the banknote transport device 1. However, if the circumferential backlash $\theta$3 is zero, the driving piece immediately presses the driven piece and causes overrun when the fraud preventing motor 120 is stopped at a timing when the roller 142 is fitted in the recessed portion 72. On the other hand, when the circumferential backlash $\theta$3 between the driving piece 92 and the driven piece 74 is set to 180 degrees or more as an example, a wider deceleration section can be provided by rotation of the rotary member 70 in advance of the driving gear 90 at the time of stop of the fraud preventing motor caused by fitting of the roller in the recessed portion. With the wider deceleration section, deceleration with a greater margin is enabled and impact provided to the driven piece can be significantly diminished to prevent overrun. Meanwhile, it has been considered that the deceleration effect is reduced and the occurrence rate of overrun is increased when the circumferential backlash is less than 180 degrees. From the above circumstances, the circumferential backlash is conventionally set to be large also considering that actual devices differ in the inertial force generated at the time of stop of the fraud preventing motor. However, as described above, if the circumferential backlash is above 180 degrees, the driving roller can freely rotationally move in this large angular range, so that there is a problem that the opening/closing member can be easily caused to transition to the initial rotational posture using fraudulent means.

In contrast thereto, the present inventors have found the numerical values of 40 degrees to 60 degrees as a result of researches on the most appropriate value of the circumferential backlash that can prevent the opening/closing member in a posture in which the both end openings of the guide slit are not communicated with the transport route from being rotated to the initial rotational posture by a fraudulent operation in the configuration example illustrated in FIGS. 1 to 4.

Figure 7:
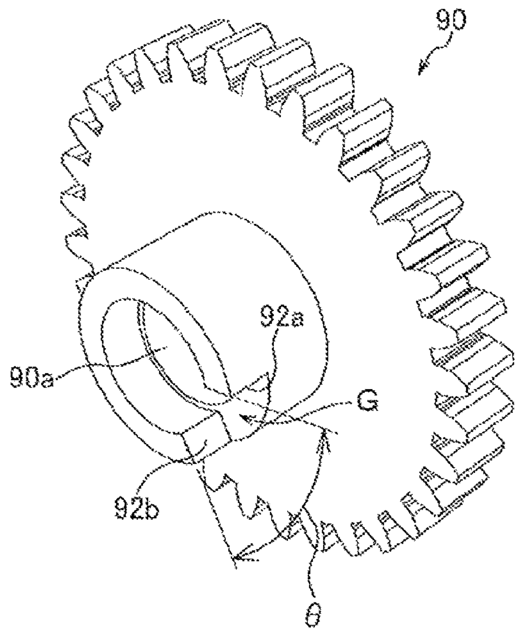
FIGS. 7(*a*) and 7(*b*) are perspective views illustrating a configuration of the driving member according to one embodiment of the present invention.
Figure 7:
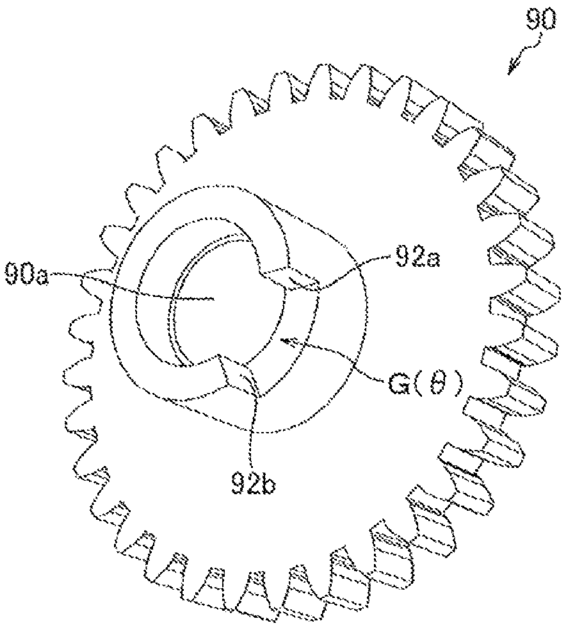
Figure 8:
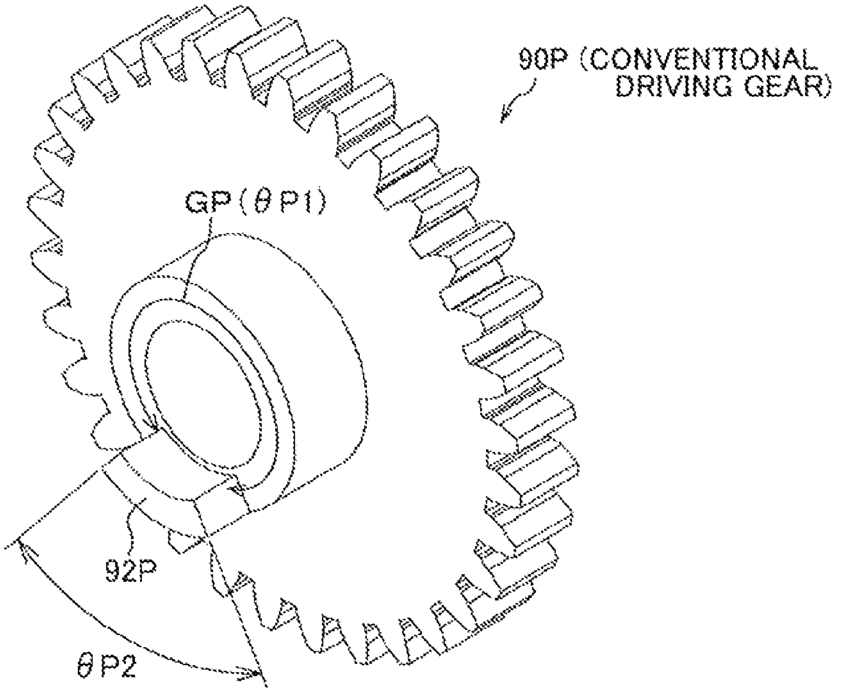
FIG. 8 is a perspective view illustrating a configuration of a driving member of a conventional example for comparison.

A difference between the driving gear 90 according to the present invention illustrated in FIG. 7 and the conventional driving gear 90P illustrated in FIG. 8 is merely a difference in the configurations of the driving pieces 92 and 92P. Therefore, a banknote handling device including an existing fraud prevention mechanism can be improved to enable prevention of a fraudulent operation on the opening/closing member described above only by replacing the driving gear with the driving gear 90 according to the present invention.

That is, since the free rotational-movement angular range of the opening/closing member with respect to the driving gear is conventionally excessive, the opening/closing member is easily rotationally moved to transition to the initial rotational posture due to an external force applied using fraudulent means. In the present invention, in contrast thereto, an improvement is added to limit the free rotational-movement angular range of the driving gear to the minimum necessary, so that a shutter function that can reliably block the transport route can be provided to the opening/closing member.

Therefore, as long as the opening/closing member is stopped in a non-initial rotational posture, the communication between the transport route and the guide slit can be blocked (a fraud can be prevented).

<Operation Procedure of Fraud Prevention Mechanism>

A procedure of the driving piece to drive the driven piece in the fraud prevention mechanism according to the present invention is explained next with reference to FIGS. 2 to 4.

In the standby state in FIG. 2(*b*), the guide slit 52 of the opening/closing member 50 is in a non-initial rotational posture rotationally moved by about 40 degrees in the clockwise direction from the initial rotational posture illustrated in FIG. 2(*c*), and the end openings 52A and 52B of the guide slit are in a completely non-communicated state with the end openings 10A and 10B of the transport route 10. This state is a closed state to prevent a banknote P inserted from the inlet 12 and transported on the transport route 10 from passing through the guide slit. In this standby state, the fraud preventing motor 120 stops the driving gear 90 and the opening/closing member 50 (the rotary member 70). Since the worm gears 130*a*' and 130*b*' are assembled in the gear mechanism 130, the driving gear 90 cannot be forwardly rotated or reversely rotated (does not rotate at all) in a state in which the fraud preventing motor is stopped.

Next, when insertion of a banknote P from the inlet 12 is detected by the sensor 14 in the standby state in FIG. 2(*b*), the fraud preventing motor 120 is driven and the driving gear 90 starts forwardly rotating. Therefore, the inner wall 92*a* presses the driven piece 74 to rotate in the forward rotation direction. When the rotation of the driving gear advances and the roller 142 sinks in the recessed portion 72 as illustrated in FIG. 2(*c*), the guide slit 52 is brought to the initial rotational posture communicated with the transport route 10 and the fraud preventing motor stops in this state.

In the state in FIG. 2(*c*), the driving piece 92 (the inner wall 92*a*) of the driving gear is stopped in a state of being spaced apart from the driven piece 74 with the gap g1 (the deceleration section, the angle θ11) interposed therebetween. The other inner wall 92*b* is spaced apart from the driven piece 74 with a gap g2 (an angle θ12) interposed therebetween.

When the tracking sensors 22 and 26, and the outlet sensor 30 detect that the rear end of one banknote having passed through the optical recognition sensor 18 has sequentially passed the guide slit 52 and the outlet 32, the driving gear is rotated in the forward rotation direction to rotate the opening/closing member 50 a required number of times in the forward rotation direction to catch a cord for extraction or the like fixed to the banknote.

FIGS. 3(*d*) to 4(*i*) illustrate changes in the positional relation between the driving piece and the driven piece in the course of one rotation of the driving gear.

At an initial time of the rotation of the driving gear 90, the inner wall 92*a* of the driving piece is brought into contact with the driven piece 74 and the gap g1 is lost as illustrated in FIG. 3(*d*). When the inner wall 92*a* subsequently starts pressing the rotary member (the driven piece 74), the roller 142 leaves the recessed portion 72 (moves out of the home position) as in FIG. 3(*e*) and moves onto the outer circumference 73 (FIGS. 3(*f*) and 4(*g*)).

The roller 142 further relatively moves along the outer circumference of the rotary member and passes a state in FIG. 4(*h*) to be brought to a fitted (home-in) state in the recessed portion illustrated in FIG. 4(*i*). At that time, the gap g1 as the deceleration section is formed between the driven piece 74 and the inner wall 92*a*, and the possibility that the inner wall 92*a* presses the driven piece 74 to cause the rotary member (the opening/closing member) to overrun is reduced.

In the home-in state illustrated in FIG. 4(*i*), the fraud preventing motor 120 stops driving and the driving piece 92 (the driving gear 90) accordingly starts decelerating movement in the gap g1 at the illustrated position. That is, since the driving piece 92 is cut off from the drive force transmission from the motor 120 in a state in which the deceleration section g1 illustrated in FIG. 4(*i*) remains between the driving piece 92 and the driven piece 74, the driving piece 92 thereafter continues the rotation in the forward rotation direction with inertia.

When the circumferential backlash θ3 between the driving piece 92 of the driving gear and the driven piece 74 of the rotary member is set to a value more than 180 degrees, for example, 260 degrees, momentum at a time when the driving piece 92 moving in the deceleration section g1 in the forward rotation direction is brought into contact with the driven piece 74 in a stopped state can be sufficiently decreased. Therefore, the possibility that the driving gear 90 is stopped without affecting the stopped state of the rotary member can be increased.

However, if the circumferential angle of the gap G of the driving gear is too large, the fraudulent act described above is allowed and an improvement in this point has been demanded.

In the fraud prevention mechanism 24 of the present invention, the value of the circumferential backlash θ3 (θ1-θ2) between the driven piece and the driving piece during a period in which the opening/closing member is stopped in a non-initial rotational posture as in FIG. 2(*b*) is set to a value (for example, 40 degrees to 60 degrees) that can prevent the opening/closing member from being forwardly rotated to transition to the initial rotational posture. Therefore, in all conditions, it is possible to prevent fraudulent transition of the opening/closing member in a non-initial rotational posture to the initial rotational posture (to block the transport route). Accordingly, a fraudulent access from outside to a downstream side of the rotary member, for example, to the banknote storage can be prevented.

An act of causing the opening/closing member to transition to the initial rotational posture using fraudulent means at a standby time of the banknote transport device 1 is easier as the circumferential backlash forming the deceleration section between the driving piece 92 of the driving gear 90 and the driven piece 74 of the rotary member 70 is larger. Particularly, by setting the circumferential backlash value θ3 between the driving piece and the driven piece to, for example, 180 degrees or larger, the opening/closing member can be more easily caused to transition to the initial rotational posture as explained with reference to FIG. 10.

On the other hand, in the device configuration of the present invention illustrated in FIGS. 1 to 4, the circumferential backlash value θ3 between the driving piece and the driven piece at a time when the opening/closing member is in a non-initial rotational posture is set to a value (a fraud prevention value) that enables prevention of transition of the opening/closing member to the initial rotational posture caused by a rotational operation using fraudulent means inserted through the paper sheet transport route. Specific appropriate values (appropriate values as an example) of the circumferential backlash θ3 are less than 90 degrees, particularly about 40 degrees to 60 degrees in the configuration example in FIGS. 1 to 4 and a human-induced rotational operation of the opening/closing member as a premise of the fraudulent act described above can be prevented.

Even if the circumferential backlash value θ3 between the driving piece and the driven piece is set to a minimum necessary value (for example, 40 degrees to 60 degrees) to enable prevention of a fraudulent act, the possibility of a fraud of rotating the opening/closing member to cause the guide slit to be communicated with the transport route remains depending on the posture or angle of the opening/closing member at the standby time. That is, when the posture of the opening/closing member at the standby time is out of the initial rotational posture illustrated in FIG. 2(*c*) by 40 degrees in the clockwise direction, as illustrated in FIG. 2(*b*), the end openings 52A and 52B of the guide slit cannot be communicated with the end openings 10A and 10B of the transport route 10 even when the opening/closing member is forwardly rotated using the circumferential backlash of 40 degrees to 60 degrees. When the opening/closing member is out of the initial rotational posture by 90 degrees in the clockwise direction as in FIG. 3(*f*), the opening/closing member needs to be forwardly rotated by 90 degrees to cause the end openings 52A and 52B of the guide slit to be communicated with the end openings 10A and 10B. Therefore, when the circumferential backlash θ3 is 40 degrees to 60 degrees, the end openings 52A and 52B of the guide slit cannot be communicated with the end opening 10A and 10B of the transport route even if the opening/closing member is forwardly rotated using the circumferential backlash.

However, although not illustrated, when the posture of the guide slit is at an angle shifted further by 50 degrees in the clockwise direction from the state in FIG. 3(*f*) (at an angle shifted by 140 degrees from the initial rotational posture in FIG. 2(*c*)), the end openings of the guide slit are completely communicated with the end openings of the transport route only by forwardly rotating the opening/closing member by about 40 degrees.

Therefore, in the fraud prevention mechanism 24 using the driving gear 90 including the driving piece 92 according to the present invention illustrated in FIG. 7, a non-initial rotational posture of the opening/closing member in the standby state illustrated in FIG. 2(*b*) needs to be selected to prevent the end openings of the guide slit from being communicated with the transport route when the opening/closing member is rotated in the range of the circumferential backlash θ3 between the driving piece and the driven piece. Conversely, the opening/closing member can be in any posture in the standby state unless the end openings of the guide slit are communicated with the transport route when the opening/closing member is rotated in the range of the circumferential backlash θ3. That is, the posture of the opening/closing member in the standby state illustrated in the configuration example of FIG. 2(*b*), which is at an angle forwardly rotated by 40 degrees from the initial rotational posture in FIG. 2(*c*), is merely an example.

As described above, in the present invention, to prevent a fraudulent act to rotate the opening/closing member to transition to the initial rotational posture by an operation from outside, the angle of the opening/closing member (the guide slit) in a non-initial rotational posture as well as the value of the circumferential backlash θ3 needs to be appropriately set in advance.

Figure 12:
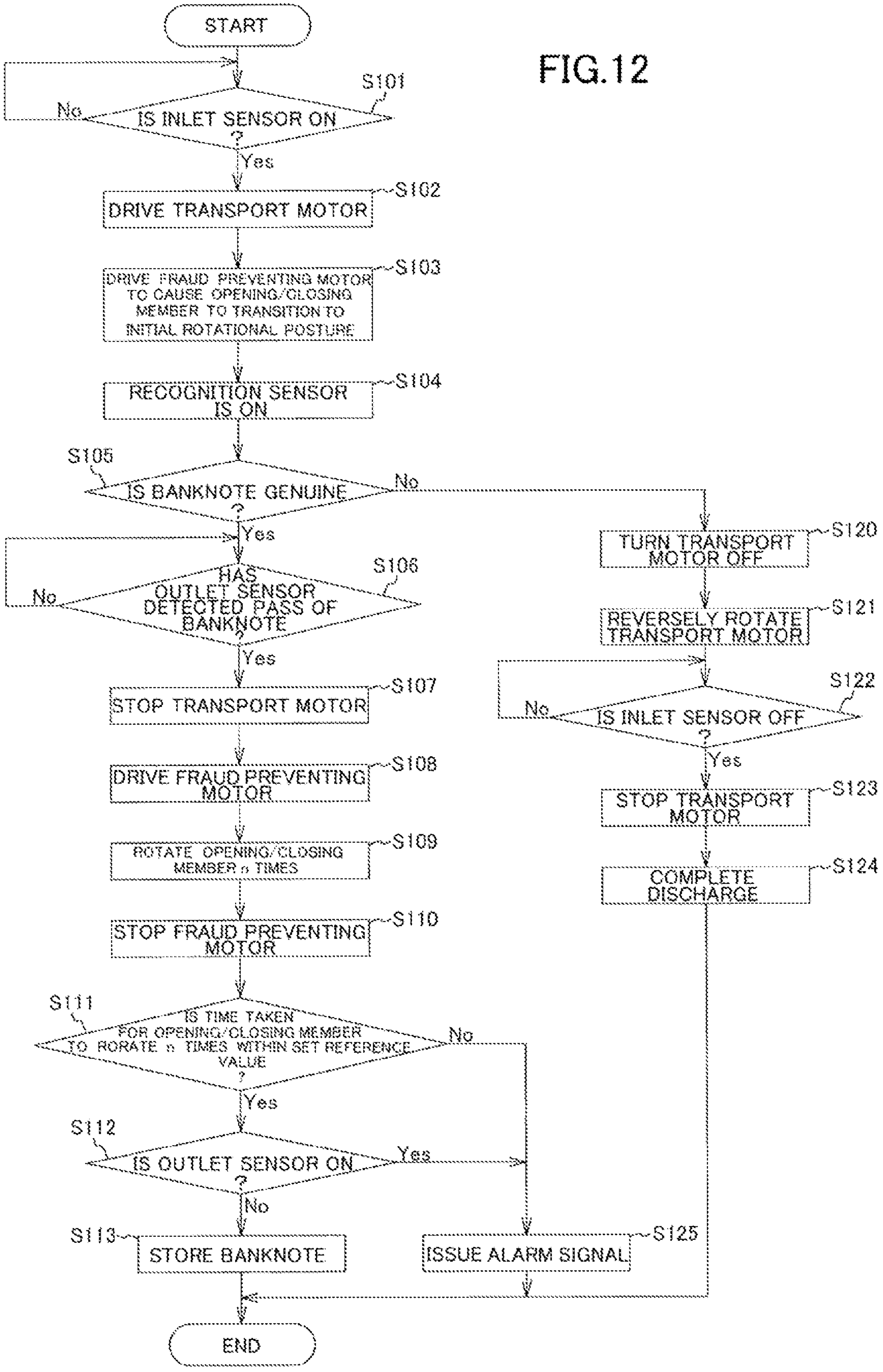
FIG. 12 is a flowchart illustrating a control procedure of a fraud detecting and fraud preventing operation in the fraud prevention mechanism.

A control procedure of a fraud detecting and fraud preventing operation in the fraud prevention mechanism 24 is explained next with reference to a flowchart of FIG. 12.

At Step 101, the control unit (a recognition control circuit) 200 is waiting to detect whether a banknote is input to the inlet 12. In the standby state before a banknote is inserted into the inlet 12, the guide slit 52 of the opening/closing member 50 is kept in the non-initial rotational posture (non-communicated posture) illustrated in FIG. 2(*b*) in which the end opening 10A upstream of the transport route 10 is not communicated with the end opening 10B downstream thereof. When a banknote is input to the inlet 12 provided at one end of the transport route 10, the inlet sensor 14 detects insertion of the banknote and sends an output to the control unit 200. After the banknote passes through the inlet sensor 14, the fraud preventing motor 120 is driven to rotate the driving gear 90 by a required angle in the forward rotation direction, thereby causing the opening/closing member to transition to the initial rotational posture illustrated in FIG. 2(*c*) (Step 103).

Next, the control unit 200 drives the transport motor 35 to transport the banknote along the transport route 10 at Step 102, and turns on the optical recognition sensor 18 at Step 104.

When the banknote moving along the transport route 10 passes the optical recognition sensor 18, the control unit 200 receives an output of the optical recognition sensor 18 and determines whether the transported banknote is a genuine banknote (Step 105). When the control unit 200 determines that the banknote is genuine based on optical features of the banknote, it is determined whether the outlet sensor 30 detects pass of the banknote at Step 106. When the outlet sensor 30 detects pass of the banknote, the transport motor 35 is stopped at Step 107. The banknote passes the outlet sensor 30 and the outlet 32, and after the transport motor 35 is stopped, the control unit 200 sends an output to the fraud preventing motor 120 to rotate the opening/closing member 50 *n* times at Steps 108 and 109, and subsequently stops the fraud preventing motor at Step 110. This enables determination at Step 111 to be performed after the fraud preventing motor is stopped.

At Step 111, the control unit 200 determines whether the opening/closing member 50 has rotated n times, and stops the operation of the fraud preventing motor 120 when the opening/closing member 50 has rotated n times and the home-position detecting sensor 160 detects the detectable portion 144*c* of the lever. The opening/closing member 50 is rotated n times to determine whether the total time taken from home-out to home-in during n times of rotation of the opening/closing member 50 after a banknote is stored in a stacker device is longer than a set reference time (whether timeout has passed) on the basis of detection information from the home-position detecting sensor 160.

Usage of the total time taken for n times of rotation in the determination using the set reference value is merely an example, and "the time taken for one rotation×n times of determination" may be used.

Figure 13:
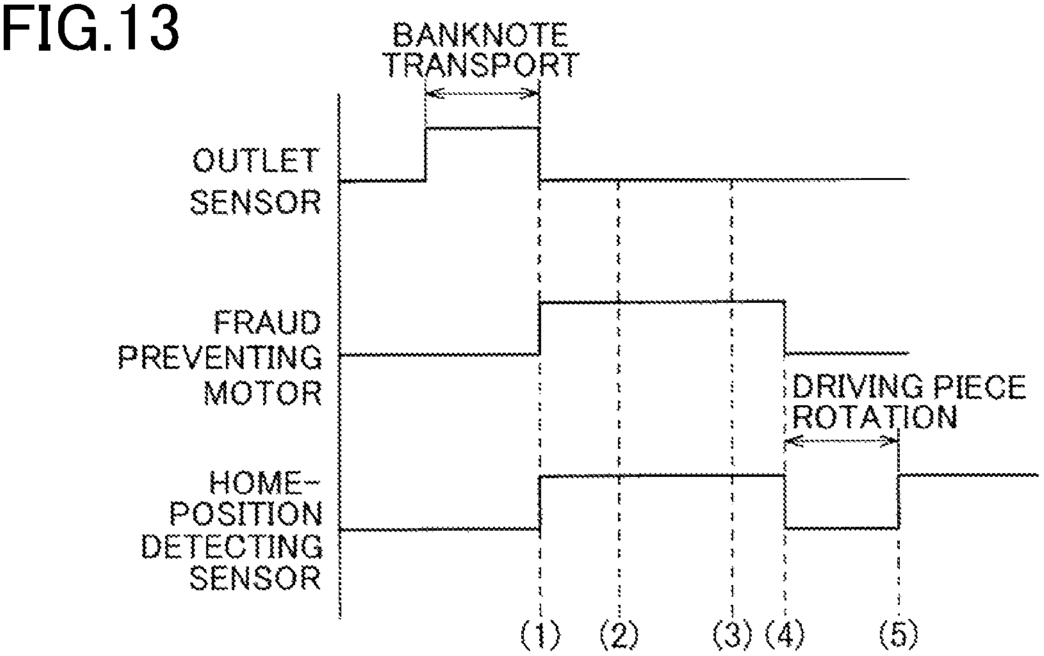
FIG. 13 is a timing chart illustrating operations of an outlet sensor, a fraud preventing motor, and a home-position detecting sensor.
Figure 14:
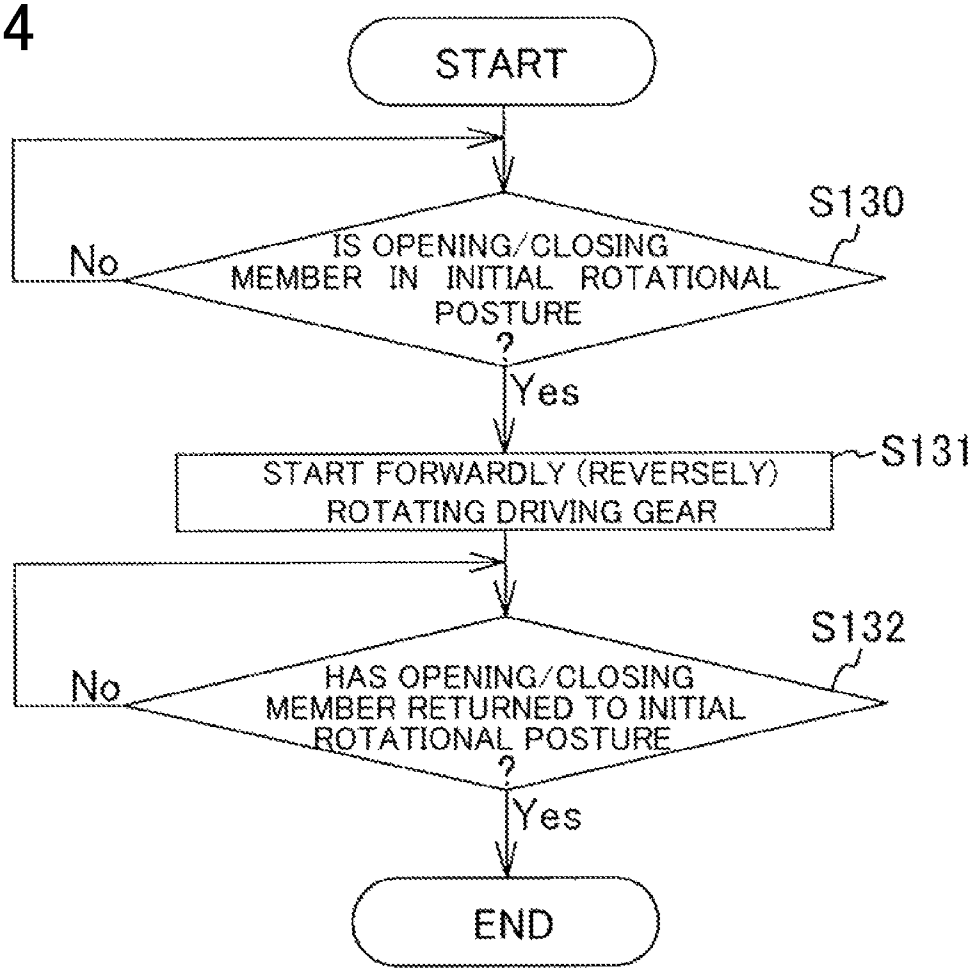
FIG. 14 is a flowchart illustrating an operation procedure of rotating the opening/closing member n times.

As indicated by a timing chart illustrating operations of the outlet sensor, the fraud preventing motor, and the home-position detecting sensor in FIG. 13, the outlet sensor 30 issues an output when detecting pass of a banknote. At a time when the rear end of the banknote has completely passed the outlet sensor 30, the fraud preventing motor 120 is biased in response to an output of the control unit 200 and the inner wall 92*a* of the driving piece 92 of the driving gear starts pressing the driven piece 74 of the rotary member as illustrated in FIG. 3(*d*), so the opening/closing member 50 begins to rotate. Subsequently, as illustrated in FIG. 3(*e*), the roller 142 moves outward in the radial direction of the opening/closing member 50 against the elastic force of the lever biasing member 146, and the detectable portion 144*c* of the lever separates from the home-position detecting sensor 160, so that the home-position detecting sensor 160 issues an output "1". When the opening/closing member 50 further rotates and passes the states illustrated in FIGS. 3(*f*) and 4(*g*), and the roller 142 is rotated up to a place before the recessed portion 72 as illustrated in FIG. 4(*h*) that illustrates a state immediately before home-in, the roller 142 presses the end of the recessed portion 72 in the forward rotation direction with the elastic force of the lever biasing member 146. Accordingly, when the roller 142 is fitted in the recessed portion 72 as illustrated in FIG. 4(*i*) that illustrates a home-in state, the opening member 50 and the rotary member 70 operate to rotate ahead of the driving gear 90 as illustrated in FIG. 4(*i*) and form an angular clearance (the deceleration section g1) between the driving piece 92 (the inner wall 92*a*) of the driving gear and the driven piece 74 of the opening/closing member.

In the home-in state illustrated in FIG. 4(*i*), the output of the home-position detecting sensor 160 changes from "1" to "0" as illustrated by (4) in FIG. 13. Therefore, the operation of the fraud preventing motor 120 is stopped.

When the extraction means U such as a cord, a string, or a tape is coupled to a genuine banknote having passed through the outlet 32, the extraction means is in a state of being spreading in the transport route 10 and the slit 52 of the opening/closing member 50. Therefore, when the opening/closing member 50 is rotated n times at Steps 108 and 109, the extraction means U is wound on the outer circumference of the opening/closing member 50 while being held in a small clearance formed between the recessed and projected portion 56 of the opening/closing member 50 and the recessed and projected portion of the device body. Since the rotation of the opening/closing member 50 is interfered by the extraction means because of winding of the extraction means around the outer circumference of the opening/closing member 50, the rotation speed of the opening/closing member 50 is lowered as compared to the set reference value. Therefore, when the time taken for the opening/closing member to rotate n times (the total time taken from home-out to home-in during the n times of rotation) is longer than the set reference value (at the time of timeout) at Step 111, the control unit 200 determines that the extraction means is coupled to a banknote and issues an alarm signal to the alarm 110 to actuate the alarm 110 at Step 125, and then the procedure ends. The extraction means wound around the outer circumference of the opening/closing member 50 can be removed by rotating the opening/closing member 50 after opening the upper unit 4. When the time taken for the opening/closing member to rotate n times is within the set reference value at Step 111, the control unit 200 determines that the extraction means is not coupled to the banknote and the procedure proceeds to Step 112 where the control unit 200 determines whether the outlet sensor 30 is on. When the banknote is stored in the banknote storage (the stacker device), the outlet sensor 30 is kept in an off-state. However, when the banknote is extracted by the extraction means, the banknote reversely passes the outlet sensor 30 and the outlet sensor 30 is accordingly turned on. When the outlet sensor 30 is in an on-state at Step 112, the control unit 200 determines that the banknote is extracted by the extraction means and issues an alarm signal at Step 125. When the outlet sensor 30 is in the off-state at Step 112, the banknote is stored in the stacker device at Step 113 and then the procedure ends.

When the control unit 200 does not determine that the banknote is genuine at Step 105, the transport motor 35 is stopped and is reversely rotated at Steps 120 and 121, to return the banknote toward the inlet 12.

When the inlet sensor 14 is turned off at Step 122, the control unit 200 stops driving of the transport motor 35 (Step 123) to complete discharging of the banknote (Step 124), and then the procedure ends.

[Summary of Configurations, Operations, and Effects of Present Invention]

A fraud prevention mechanism 24 according to the first invention is a unit that is installed on a paper sheet transport route 10 to prevent a fraudulent act on a paper sheet, including: an opening/closing member 50 that allows pass of the paper sheet when in an initial rotational posture, and that blocks pass of the paper sheet when in a non-initial rotational posture out of the initial rotational posture; a rotary member 70 that rotates integrally with the opening/closing member; a driving member 90 for opening/closing member driving, that is arranged to oppose the rotary member and that is axially supported to be capable of relatively rotating with respect to the rotary member; and a drive transmission mechanism 100 that transmits a drive force from the driving member to the rotary member, in which the drive transmission mechanism includes a driven piece 74 provided on the rotary member, and at least one driving piece 92 that is provided on the driving member and that rotationally drives the rotary member by pressing the driven piece in a course of relatively rotationally moving with respect to the driven piece, a circumferential backlash θ3 for allowing rotation of the driven piece with respect to the driving piece stopped rotating is provided between the driven piece and the driving piece, and an angle of the opening/closing member in the non-initial rotational posture, and a value of the circumferential backlash are set to enable prevention of the opening/closing member from being rotated to transition to the initial rotational posture by an operation from outside while the opening/closing member is stopped in the non-initial rotational posture.

When the circumferential backlash between the driving piece 92 of the driving gear and the driven piece 74 of the rotary member is zero or too small, there is an advantage that a fraudulent access to a paper storage located downstream of the opening/closing member 50 by fraudulently rotating the opening/closing member in a non-initial rotational posture can be prevented.

In principle, when a condition "the backlash angle θ3"≥"an angle θ11 of a gap g1 produced at the time of braking at the home position" is met, stop without overrun is possible. However, the backlash angle is set to be large with a margin for variation of the gap g1 caused by conditions such as a machine difference, an environment, and an abrasion resistance. Therefore, there is room for the above problem of a fraudulent access using a large circumferential backlash to occur.

As described above, an optimum numerical value as the value of the circumferential backlash, which can block a fraudulent access to the opening/closing member while preventing overrun is not conventionally found.

According to the fraud prevention mechanism of the present invention, in a fraud prevention mechanism including an opening/closing member for fraud detection and prevention, which is provided on a transport route for a paper sheet to allow or block pass of a banknote by changing the rotational posture, a problem that the posture of the opening/closing member is fraudulently changed to the initial rotational posture during waiting for reception of a paper sheet can be solved while effectively preventing misalignment in the stop position of the opening/closing member.

In the fraud prevention mechanism according to the second invention, a gear mechanism is arranged between the driving member and a fraud preventing motor that drives the driving member, and the gear mechanism allows the driving member to rotate only in one direction within a range of the circumferential backlash when the fraud preventing motor is stopped.

A paper sheet transport device according to the third invention includes the fraud prevention mechanism described above.

According to the banknote handling device, fraud detection and fraud prevention effects provided by the fraud prevention mechanism can be achieved.

A paper sheet handling device according to the fourth invention includes the paper sheet transport device described above.

According to the banknote handling device, fraud detection and fraud prevention effects provided by the fraud prevention mechanism can be achieved.

REFERENCE SIGNS LIST

1 banknote transport device, 3 lower unit, 4 upper unit, 10 banknote transport route, 12, 16, 20, 28 roller pair, 14 inlet sensor, 18 optical recognition sensor, 22, 26 tracking sensor, 24 fraud prevention mechanism, 28 outlet roller pair, 30 outlet sensor, 32 outlet, 50 opening/closing member, 52 guide slit, 54 rotation shaft, 56 recessed and projected portion, 70 rotary member, 70A depressed portion, 72 recessed portion, 73 outer circumferential edge, 74 driven piece, 90 driving gear (driving member), 92 driving piece, 92*a*, 92*b* inner wall (driving piece), 100 drive transmission mechanism, 120 fraud preventing motor, 130 gear mechanism, 140 rotational-posture detecting unit, 142 roller (following member), 142*a* shaft, 144 lever, 144*a* support portion, 144*b* shaft portion, 144*c* detectable portion, 146 lever-biasing member, 160 home-position detecting sensor, 200 control unit

The invention claimed is:

1. A fraud prevention mechanism that is installed on a paper sheet transport route to prevent a fraudulent act on a paper sheet, comprising:

an opening/closing member that allows passage of the paper sheet when in an initial rotational posture, and that blocks passage of the paper sheet when in a non-initial rotational posture out of the initial rotational posture;

a rotary member that rotates integrally with the opening/closing member;

a driving member for opening/closing member driving, that is arranged to oppose the rotary member and that is axially supported to be capable of relatively rotating with respect to the rotary member; and a drive transmission mechanism that transmits a drive force from the driving member to the rotary member, wherein the drive transmission mechanism includes a driven piece provided on the rotary member, and a driving piece that is provided on the driving member and that rotationally drives the rotary member by pressing the driven piece in a course of relatively rotationally moving with respect to the driven piece, a circumferential backlash for allowing rotation of the driven piece with respect to the driving piece configured to limit rotation between the driven piece and the driving piece, and an angle of the opening/closing member in the non-initial rotational posture, and a value of the circumferential backlash are set to enable prevention of the opening/closing member from being rotated to transition to the initial rotational posture by an operation from outside while the opening/closing member is stopped in the non-initial rotational posture.

2. The fraud prevention mechanism according to claim 1, wherein a gear mechanism is arranged between the driving member and a fraud preventing motor that drives the driving member, and the gear mechanism interferes with rotation of the driving member when the fraud preventing motor is stopped.

3. A paper sheet transport device comprising the fraud prevention mechanism according to claim 1.

4. A paper sheet handling device comprising the paper sheet transport device according to claim 3.

5. A paper sheet transport device comprising the fraud prevention mechanism according to claim 2.

* * * * *